United States Patent
Nogiwa et al.

(10) Patent No.: US 6,864,995 B2
(45) Date of Patent: Mar. 8, 2005

(54) GRADATION CORRECTION CURVE PRODUCING METHOD, GRADATION CORRECTION CURVE PRODUCING APPARATUS, AND GRADATION CORRECTION CURVE PRODUCING PROGRAM STORAGE MEDIUM

(75) Inventors: Masaki Nogiwa, Kanagawa (JP); Kiyomi Tamagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 928 days.

(21) Appl. No.: 09/793,401

(22) Filed: Feb. 27, 2001

(65) Prior Publication Data

US 2001/0033387 A1 Oct. 25, 2001

(30) Foreign Application Priority Data

Feb. 29, 2000 (JP) ........................................ 2000-053887

(51) Int. Cl.$^7$ ................................................ H04N 1/46
(52) U.S. Cl. ................. 358/1.9; 358/504; 358/518; 358/521; 347/19; 382/167
(58) Field of Search ...................... 358/1.1, 1.9, 504, 358/518, 521; 347/15, 19, 115, 183, 188; 382/162, 167

(56) References Cited

U.S. PATENT DOCUMENTS

| 5,483,360 A | * | 1/1996 | Rolleston et al. ............ 358/518 |
| 5,574,544 A | * | 11/1996 | Yoshino et al. ............... 399/60 |
| 6,026,216 A | * | 2/2000 | Ohtsuka et al. .............. 358/1.9 |
| RE38,180 E | * | 7/2003 | Edge ............................ 347/19 |
| 6,668,077 B1 | * | 12/2003 | Ohkubo ...................... 382/162 |

* cited by examiner

*Primary Examiner*—Thomas D. Lee
(74) *Attorney, Agent, or Firm*—Sughrue Mion, PLLC

(57) ABSTRACT

There are disclosed gradation correction curve producing method and apparatus for producing a gradation correction curve for correcting a gradation of an image. Density of monochromatic density patches for C, M, Y is measured to determine a first gradation correction curve, and colorimetry of gray density patches consisting of a combined color of C, M, Y is performed to determine a second gradation correction curve for each monochrome of C, M, Y determined from colorimetry values. A gradation correction curve for each monochrome of C, M, Y for gradation correction is determined using the first gradation correction curve and the second gradation correction curve.

9 Claims, 13 Drawing Sheets

GRADATION CORRECTION CURVE PRODUCING METHOD, GRADATION CORRECTION CURVE PRODUCING APPARATUS, AND GRADATION CORRECTION CURVE PRODUCING PROGRAM STORAGE MEDIUM

BACKGROUND OF THE INVENTION

1. Field of the Invention

The present invention relates to a gradation correction curve producing method and a gradation correction curve producing apparatus for producing a gradation correction curve to correct gradation of an image, and a gradation correction curve producing program storage medium storing a gradation correction curve producing program, when executed in a computer, which causes the computer to operate as the gradation correction curve producing apparatus.

2. Description of the Related Art

Hitherto, it is performed that image data is taken into a personal computer and the like to be subjected to an edition of an image on the image data, and the image data subjected to the edition is subjected to a color conversion to meet characteristics of an image output apparatus of interest, such as a color printer, and further subjected to a gradation correction and the like, and then the image data is outputted to the image output apparatus so that the image output apparatus outputs a desired image.

In the personal computer and the like, the various sorts of processing as mentioned above are performed. particularly, in the gradation correction processing, there is performed such a processing that a gradation correction curve is defined in form of an LUT (look-up-table) for each of monochromes of for example cyan (C), magenta (M), yellow (Y) and black (K), and the image data of CMYK are converted in accordance with the associated gradation correction curves, respectively.

To make up such a gradation correction curve, the personal computer or the like is used to produce image data representative of a color chart consisting of a plurality of density patches on each of C, M, Y and K, and the image data thus produced are fed to an image output apparatus such as a color printer so that the image output apparatus outputs a color chart. Densities of density patches of C, M, Y and K constituting the outputted color chart thus outputted are measured. Association of the density measurement result of the density patches thus obtained with the values of the image data when the density patches are produced makes it possible to make up the gradation correction curve.

Basically, the gradation correction curves are able to be made up in the manner as mentioned above. However, the gradation correction curves thus made up are considered only in a color axis direction of C, M, Y and K, and thus are not always completely adjusted with respect to a gray direction consisting of a combined color of three colors of C, M and Y. In view of the foregoing, according to the prior art, the gradation correction curve is determined in such a manner that image data representative of a gray of density patch consisting of a combined color of C, M and Y is printed out through performing a gradation correction using the gradation correction curve made up once in the manner as mentioned above, the gradation correction curve is fine-controlled through evaluating a color of the gray density patch, it is determined whether gradations of monochromes of C, M and Y are within a specified tolerance and the color of the gray is also within the specified tolerance as a result of the fine-control, and the fine-control is repeated over and over so that both the monochromes and the gray offer the specified tolerance. In this case, as mentioned above, the fine-control is repeated over and over. This takes a lot of times and labors to finally obtain a gradation correction curve with great accuracy, and it needs an expert to obtain a gradation correction curve with great accuracy.

SUMMARY OF THE INVENTION

In view of the foregoing, it is an object of the present invention to provide a gradation correction curve producing method and a gradation correction curve producing apparatus capable of readily producing a gradation correction curve, and a gradation correction curve producing program storage medium storing a gradation correction curve producing program, when executed in a computer, which causes the computer to operate as the gradation correction curve producing apparatus.

To achieve the above-mentioned object, the present invention provides a gradation correction curve producing method of producing a gradation correction curve for correcting a gradation of an image, said gradation correction curve producing method comprising:

a patch output step of outputting a plurality of monochromatic density patches for each of monochromes, and a plurality of gray density patches for a gray in which the monochromes are combined;

a measurement and colorimetry step of measuring density of the plurality of monochromatic density patches, and performing a colorimetry of the plurality of gray density patches; and a gradation correction curve computing step of determining a gradation correction curve for each monochrome for gradation correction using a first gradation correction curve for each monochrome obtained through measuring density of the plurality of monochromatic density patches, and a second gradation correction curve for each monochrome determined from colorimetry values obtained through the colorimetry of the plurality of gray density patches.

According to the gradation correction curve producing method of the present invention as mentioned above, density of monochromatic density patches for C, M, Y for instance is measured to determine a first gradation correction curve, and colorimetry of gray density patches consisting of a combined color of C, M, Y is performed to determine a second gradation correction curve for each monochrome of C, M, Y determined from colorimetry values. A gradation correction curve for each monochrome of C, M, Y for gradation correction is determined using the first gradation correction curve and the second gradation correction curve. Thus, objective data is obtained by the colorimetry with respect to not only the monochromes of C, M, Y but also the gray, so that the colorimetry data of the gray is reflected on the gradation correction curve. This feature makes it possible to readily produce the gradation correction curve. Further, according to the present invention, it is possible to produce the gradation correction curve with great accuracy.

In the gradation correction curve producing method according to the present invention as mentioned above, it is preferable that said gradation correction curve computing step comprises:

a deviation correction curve computing step in which a predetermined gradation correction standard curve for each monochrome is prepared beforehand, a first gradation deviation correction curve for correcting a deviation between the first gradation correction curve and the gradation correction standard curve is determined for each monochrome, and a second gradation deviation correction curve for correcting a deviation between the second gradation correction curve and the gradation correction standard curve is determined for each monochrome;

a deviation correction curve internal division step of internally dividing the first gradation deviation correction curve and the second gradation deviation correction curve determined in said deviation correction curve computing step with a predetermined adjustable weight to determine a third gradation deviation correction curve for each monochrome; and a standard curve adjusting step of adjusting the gradation correction standard curve in accordance with the third gradation deviation correction curve determined in said deviation correction curve internal division step to determine the gradation correction curve for each monochrome for gradation correction.

In the gradation correction curve producing method according to the present invention as mentioned above it is acceptable that said deviation correction curve internal division step internally divides the first gradation deviation correction curve and the second gradation deviation correction curve determined in said deviation correction curve computing step with same weight for any monochrome to determine the third gradation deviation correction curve for each monochrome.

This feature makes it possible to readily determine the gradation correction curve for each monochrome for gradation correction with great accuracy. Further, in this case, it is sufficient for any monochrome to provide the same weight. This feature makes it easy to set up weight.

To achieve the above-mentioned object, the present invention provides a gradation correction curve producing apparatus for producing a gradation correction curve for correcting a gradation of an image, said gradation correction curve producing apparatus comprising:

a patch data producing section for producing monochromatic patch data representative of a plurality of monochromatic density patches for each of monochromes, and gray patch data representative of a plurality of gray density patches for a gray in which the monochromes are combined; and a gradation correction curve computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a gradation correction curve for each monochrome for gradation correction using a first gradation correction curve for each monochrome obtained by the density measurement data, and a second gradation correction curve for each monochrome determined from the colorimetry data.

In the gradation correction curve producing apparatus according to the present invention as mentioned above it is preferable that said gradation correction curve computing section comprises:

a deviation correction curve computing section having a memory for storing a predetermined gradation correction standard curve for each monochrome, for determining a first gradation deviation correction curve for correcting a deviation between the first gradation correction curve and the gradation correction standard curve for each monochrome, and a second gradation deviation correction curve for correcting a deviation between the second gradation correction curve and the gradation correction standard curve for each monochrome;

a deviation correction curve internal division arithmetic operation section for internally dividing the first gradation deviation correction curve and the second gradation deviation correction curve determined in said deviation correction curve computing section with weight set up in accordance with an operation to determine a third gradation deviation correction curve for each monochrome; and a standard curve adjusting section for adjusting the gradation correction standard curve in accordance with the third gradation deviation correction curve determined in said deviation correction curve internal division arithmetic operation section to determine the gradation correction curve for each monochrome for gradation correction.

In the gradation correction curve producing apparatus according to the present invention as mentioned above, it is acceptable that the gradation correction curve producing apparatus further comprises a weight set up section for setting up, as weight of an internal division of the first gradation deviation correction curve and the second gradation deviation correction curve determined in said deviation correction curve computing section, a common weight applicable to an internal division arithmetic operation for any monochrome in accordance with an operation.

To achieve the above-mentioned object, the present invention provides a gradation correction curve evaluation result display program storage medium storing a gradation correction curve evaluation result display program which causes a computer to operate as a gradation correction curve evaluation result display apparatus for displaying an evaluation result of a gradation correction curve for correcting a gradation of an image, when the gradation correction curve evaluation result display program is executed in the computer system, wherein said gradation correction curve evaluation result display program storage medium stores the gradation correction curve evaluation result display program comprising:

a patch data producing section for producing monochromatic patch data representative of a plurality of monochromatic density patches for each of monochromes, and gray patch data representative of a plurality of gray density patches for a gray in which the monochromes are combined; and a gradation correction curve computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a gradation correction curve for each monochrome for gradation correction using a first gradation correction curve for each monochrome obtained by the density measurement data, and a second gradation correction curve for each monochrome determined from the colorimetry data.

In the gradation correction curve evaluation result display program storage medium according to the present invention as mentioned above, it is preferable that said gradation correction curve computing section comprises:

a deviation correction curve computing section storing a predetermined gradation correction standard curve for each monochrome, for determining a first gradation deviation correction curve for correcting a deviation between the first gradation correction curve and the gradation correction standard curve for each monochrome, and a second gradation deviation correction curve for correcting a deviation between the second gradation correction curve and the gradation correction standard curve for each monochrome;

a deviation correction curve internal division arithmetic operation section for internally dividing the first gradation deviation correction curve and the second gradation deviation correction curve determined in said deviation correction curve computing section with weight set up in accordance with an operation to determine a third gradation deviation correction curve for each monochrome; and a standard curve adjusting section for adjusting the gradation correction standard curve in accordance with the third gradation deviation correction curve determined in said deviation correction curve internal division arithmetic operation section to determine the gradation correction curve for each monochrome for gradation correction.

In the gradation correction curve evaluation result display program storage medium according to the present invention as mentioned above, it is preferable that said gradation correction curve evaluation result display program further comprises a weight set up section for setting up, as weight of an internal division of the first gradation deviation correction curve and the second gradation deviation correction curve determined in said deviation correction curve computing section, a common weight applicable to an internal division arithmetic operation for any monochrome in accordance with an operation.

DETAILED DESCRIPTION OF PREFERRED EMBODIMENTS

Embodiments of the present invention will be described with reference to the accompanying drawings.

Figure 1:
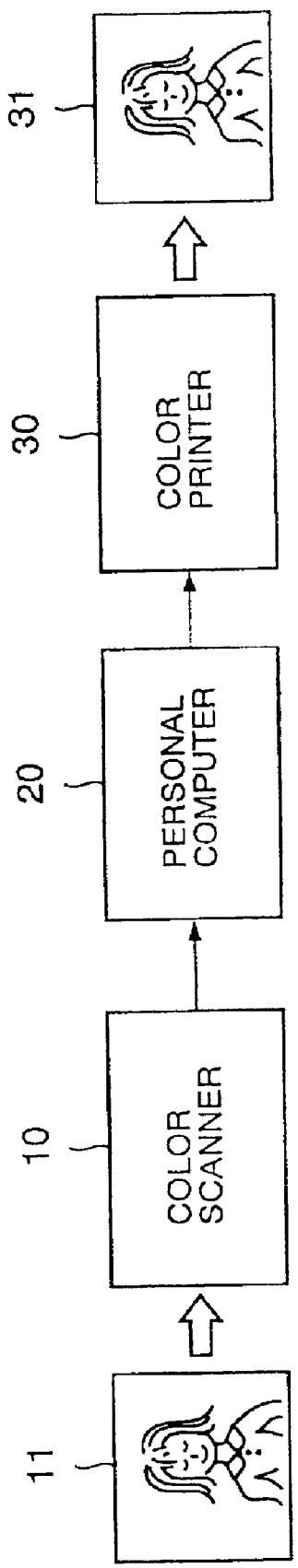
FIG. 1 is a schematic constitution view of an image input-color conversion-image output system.

FIG. 1 is a schematic constitution view of an image input-color conversion-image output system.

A color scanner 10 reads an original image 11 and produces image data of three colors consisting of cyan (C), magenta (M), and yellow (Y). The image data of the CMY three colors is fed to a personal computer 20. The personal computer 20 converts the image data obtained by the color scanner 10 into image data for an image output suitable for a color printer 30 which will be described later. The image data for the image output is fed to the color printer 30. The color printer 30 performs a print output in accordance with the entered image data so that a print image 31 is formed.

In the system shown in FIG. 1, while the color printer 30 is shown as an example of an image output device for outputting an image based on the image data, any one is acceptable, as the image output device, which is a color printer according to an electrophotographic scheme, a color printer according to an ink jet scheme, or a printer according to a system in which a printing paper is exposed with a modulated laser beam and the exposed printing paper is developed, and it doesn't matter as to the printing scheme and the printing system. Further, as the image output device, it is not restricted to a printer, and any one is acceptable which is a printing machine, or alternatively an image display device such as a CRT display unit for displaying an image on a display screen, and a plasma display unit.

Here, however, there will be described a system having the color printer 30 by way of example of the image output device.

An aspect as an embodiment of the present invention in the system shown in FIG. 1 resides in processing contents to be executed inside the personal computer 20. Hereinafter, there will be described the personal computer 20.

Figure 2:
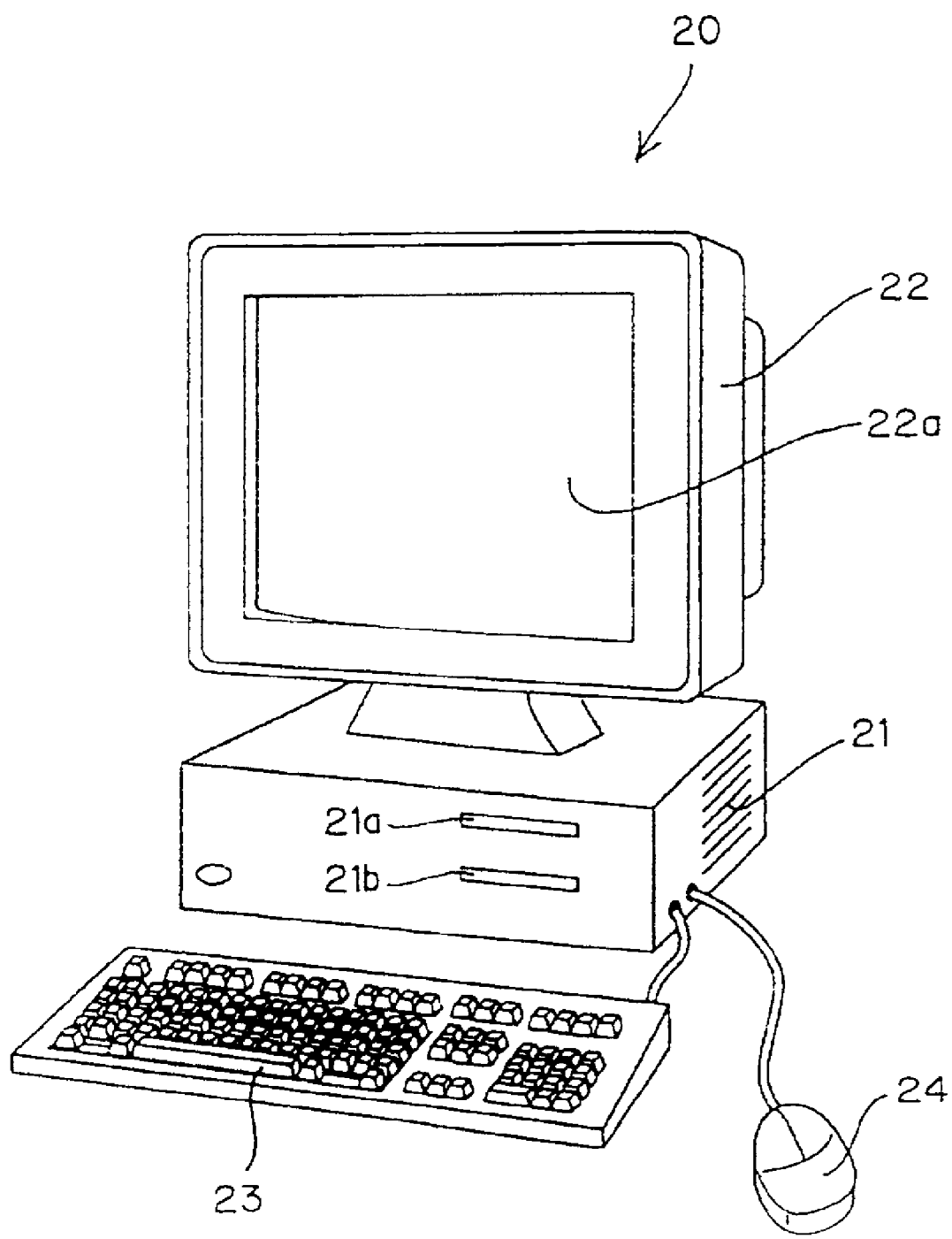
FIG. 2 is a perspective view of a personal computer shown in FIG. 1.
Figure 3:
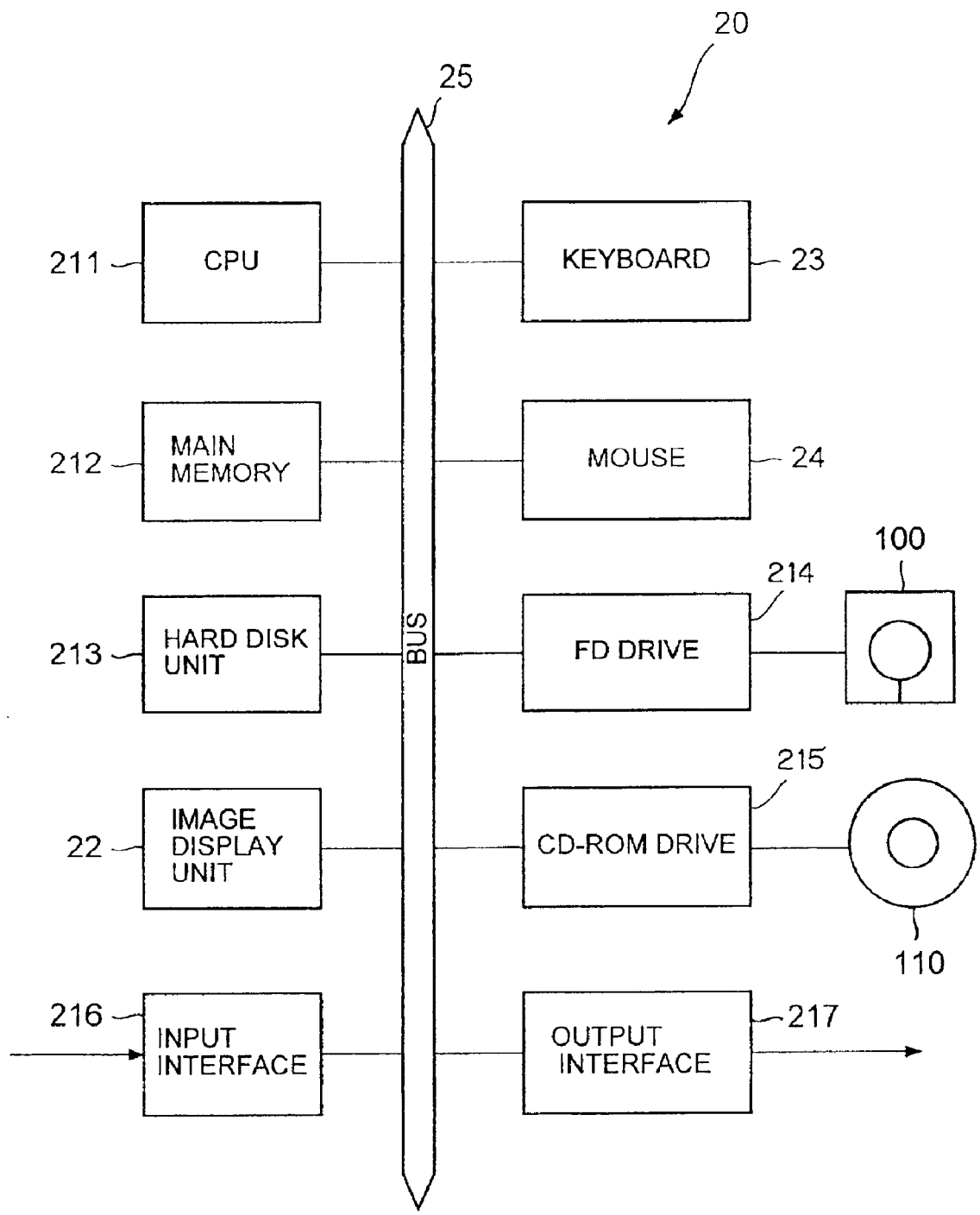
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 to transmit image data to the color printer 30. These various types of elements are connected via a bus 25 to the image display unit 22, the keyboard 23 and the mouse 24.

The CD-ROM 110 stores therein a gradation correction curve producing program for causing the personal computer 20 to operate as a gradation correction curve producing apparatus. The CD-ROM 110 is mounted on the CD-ROM drive 215 so that the gradation correction curve producing program, which is stored in the CD-ROM 110, is up-loaded on the personal computer 20 and is stored in the hard disk unit 213.

Figure 4:
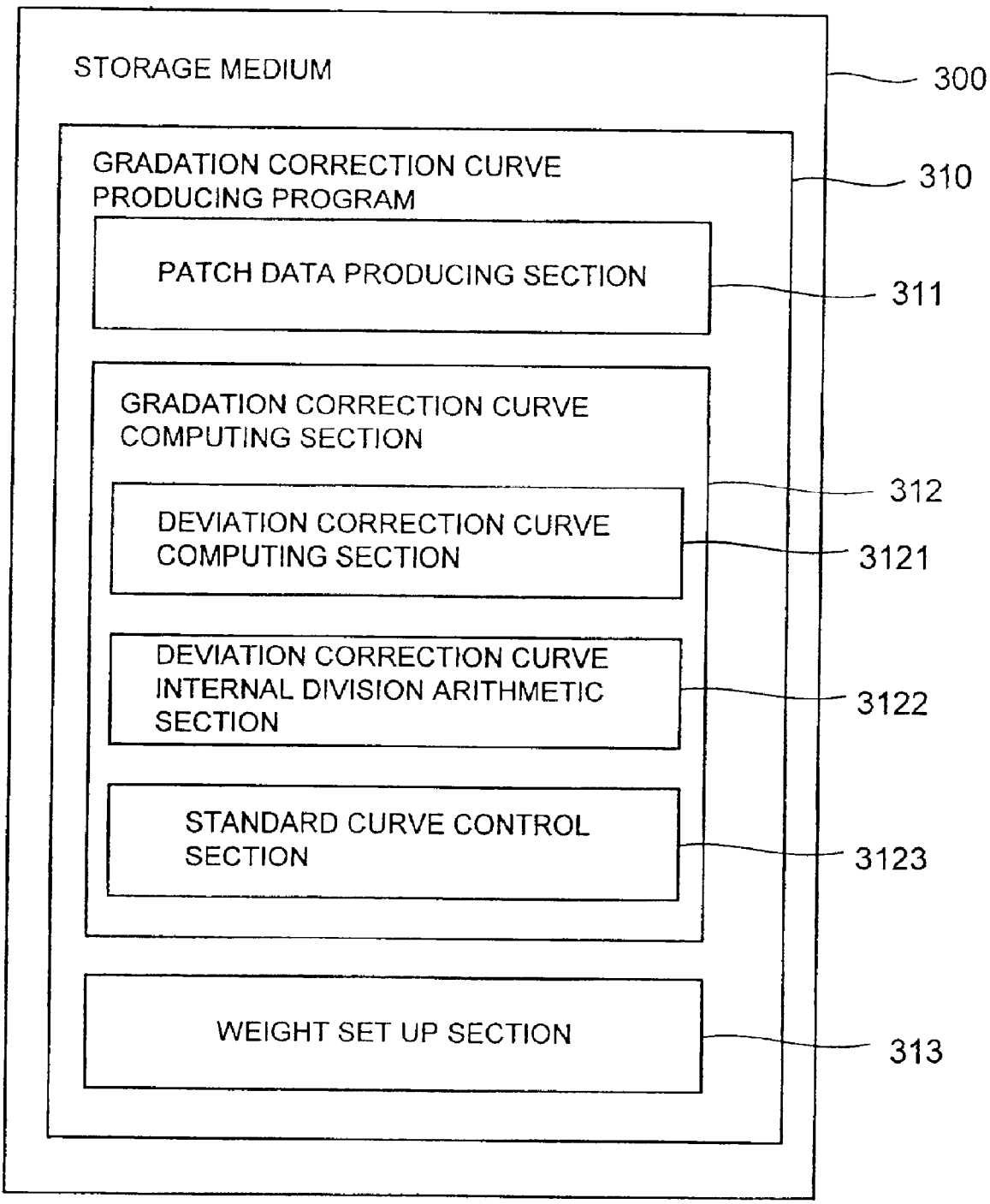
FIG. 4 is a view showing an embodiment of a gradation correction curve producing program storage medium according to the present invention.

FIG. 4 is a view showing an embodiment of a gradation correction curve producing program storage medium according to the present invention. The gradation correction curve producing program storage medium shown in FIG. 4 represents storage medium such as the CD-ROM 110 shown in FIG. 3 and the hard disk in the hard disk unit 213.

A gradation correction curve producing program storage medium 300 stores a gradation correction curve producing program 310 having a patch data producing section 311, a gradation correction curve computing section 312, and a weight set up section 313. The gradation correction curve computing section 312 comprises a deviation correction curve computing section 3121, a deviation correction curve internal division arithmetic section 3122, and a standard curve control section 3123.

Operations of the respective sections of the gradation correction curve producing program 310 will be described later. When the gradation correction curve producing program 310 is stored in the CD-ROM 110 shown in FIG. 3, the CD-ROM 110 corresponds to an example of a gradation correction curve producing program storage medium of the present invention, and when the gradation correction curve producing program 310 stored in the CD-ROM 110 is loaded onto the personal computer 20 and stored in the hard disk unit 213, the hard disk storing the gradation correction curve producing program 310 corresponds to an example of a gradation correction curve producing program storage medium of the present invention. Further, when the gradation correction curve producing program 310 within the hard disk is down loaded onto the floppy disk 100 shown in FIG. 3, the floppy disk storing the gradation correction curve producing program 310 also corresponds to an example of a gradation correction curve producing program storage medium of the present invention.

Figure 5:
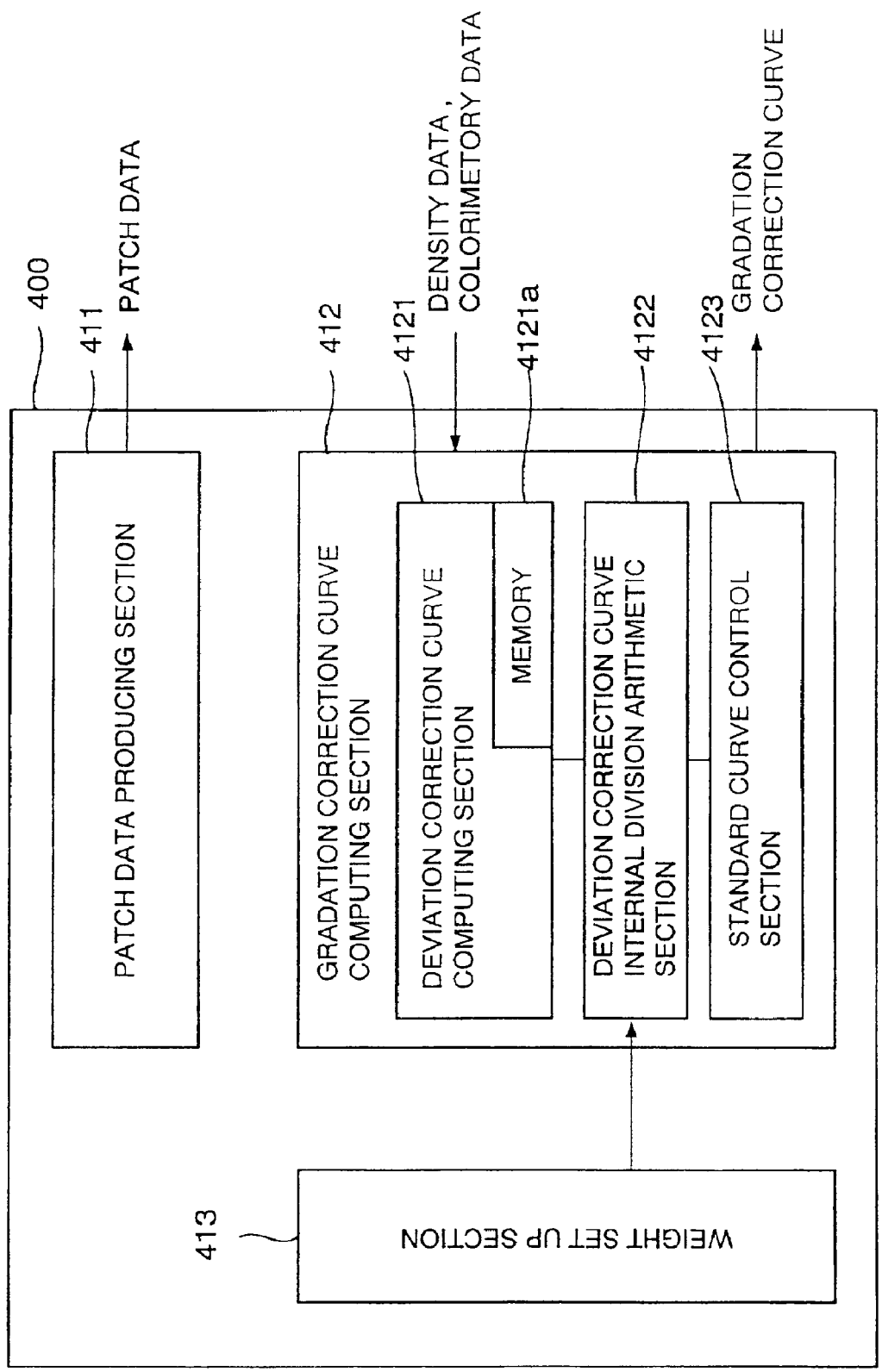
FIG. 5 is a functional block diagram of an embodiment of a gradation correction curve producing apparatus according to the present invention.

FIG. 5 is a functional block diagram of an embodiment of a gradation correction curve producing apparatus according to the present invention.

A gradation correction curve producing apparatus 400 shown in FIG. 5 is implemented when the gradation correction curve producing program 310 shown in FIG. 4 is loaded onto the personal computer 20 and is executed by the personal computer 20.

The gradation correction curve producing apparatus 400 shown in FIG. 5 comprises a patch data producing section 411, a gradation correction curve computing section 412, and a weight set up section 413. The gradation correction curve computing section 412 comprises a deviation correction curve computing section 4121, a deviation correction curve internal division arithmetic section 4122, and a standard curve control section 4123.

The patch data producing section 411, the gradation correction curve computing section 412 (the deviation correction curve computing section 4121, the deviation correction curve internal division arithmetic section 4122, and the standard curve control section 4123), and the weight set up section 413, which constitute the gradation correction curve producing apparatus 400 shown in FIG. 5, comprise the combinations of the patch data producing section 311, the gradation correction curve computing section 312 (the deviation correction curve computing section 3121, the deviation correction curve internal division arithmetic section 3122, and the standard curve control section 3123), and the weight set up section 313, which are shown in FIG. 4 as software parts, with the hardware of the personal computer 20 and the operating systems (OS), respectively.

Figure 6:
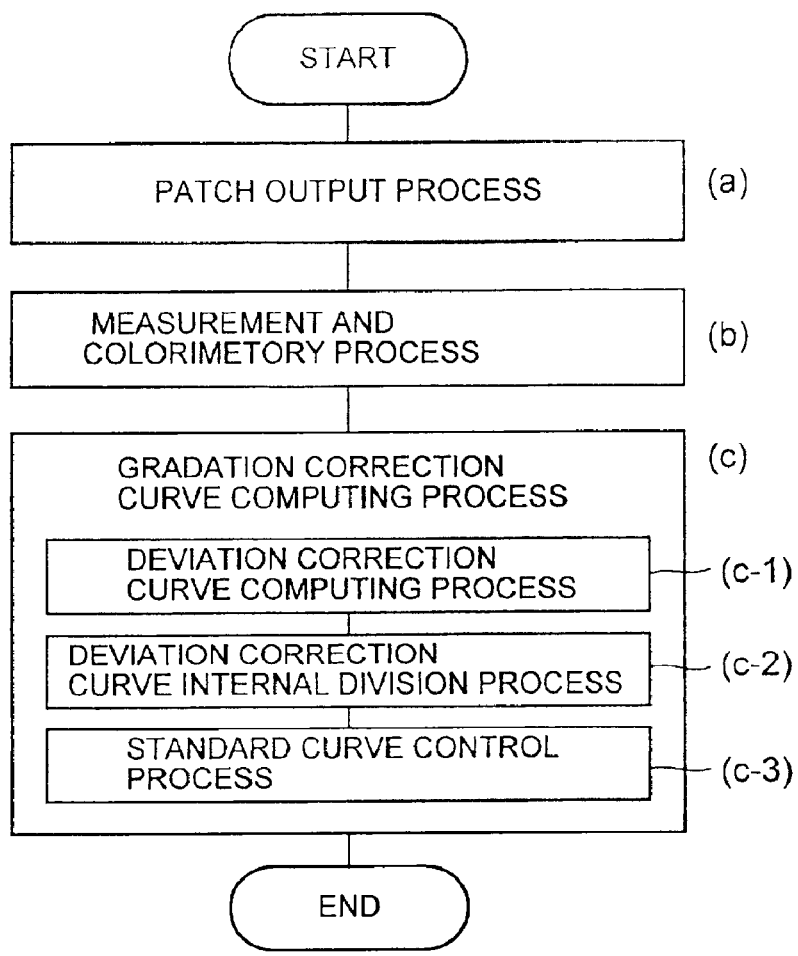
FIG. 6 is a flowchart useful for understanding a procedure of producing a gradation correction curve using the gradation correction curve producing apparatus shown in FIG. 5.

FIG. 6 is a flowchart useful for understanding a procedure of producing a gradation correction curve using the gradation correction curve producing apparatus 400 shown in FIG. 5.

In the explanation of the flowchart of FIG. 6, there will be explained the respective sections of the gradation correction curve producing apparatus 400 shown in FIG. 5 (accordingly, the respective sections of the gradation correction curve producing program storage medium 300 shown in FIG. 4).

First, in a patch output process (step (a)) of FIG. 6, the patch data producing section 411 of FIG. 5 is operated to produce patch data to output a patch based on the patch data. That is, the patch data producing section 411 of the gradation correction curve producing apparatus 400 shown in FIG. 5 produces monochromatic patch data representative of a plurality of monochromatic density patches for each of the monochromes of C, M, Y, and gray patch data representative of a plurality of gray density patches as to a gray in which the monochromes of C, M, Y are combined. Further, according to the present embodiment, the patch data producing section 411 produces monochromatic patch data representative of a plurality of monochromatic density patches for the monochrome of K (black) as well as the monochromes of C, M, Y.

Those patch data thus produced are transmitted to the color printer 30 shown in FIG. 1. The color printer 30 outputs a color chart consisting of a large number of patches in accordance with the received patch data.

Figure 7:
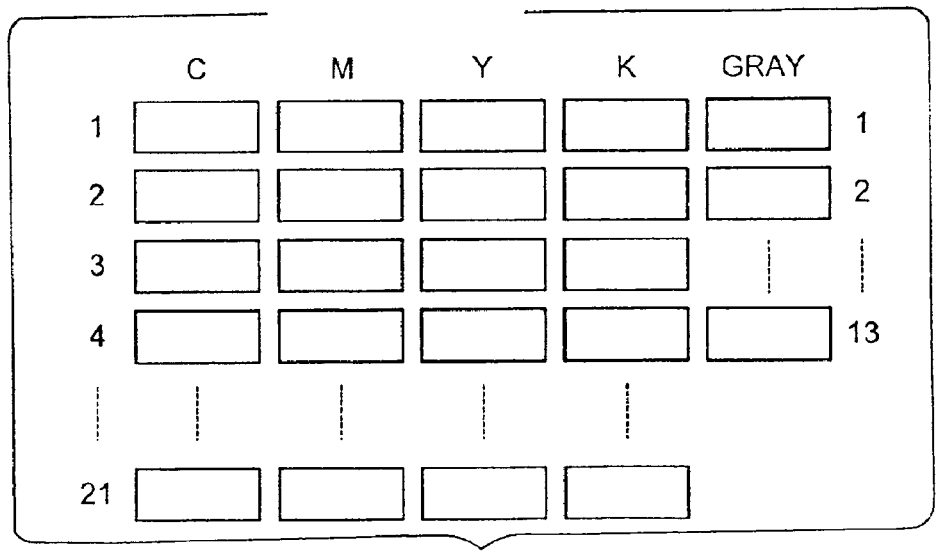
FIG. 7 is a view showing an example of a color chart.

FIG. 7 is a view showing an example of a color chart.

In FIG. 7, there are formed 21 steps of density patches for each of the monochromes of C, M, Y, K and 13 steps of density patches for a gray as the combined color of C, M, Y.

Next, in a measurement and colorimetry process (step (b)) in FIG. 6, there is performed a measurement of the color chart shown in FIG. 7.

This measurement itself is a work that an operator performs using for example a calorimeter with a density measurement mode, apart from the gradation correction curve producing apparatus 400 shown in FIG. 5.

Here, with respect to the patches for the respective monochromes of C, M, Y, K of the color chart shown in FIG. 7, densities of the respective monochromes are measured to determine density values for the patches. And with respect to the patches for the gray, a colorimetry is performed to determine colorimetry values of L*a*b* for each patch.

Next, processing for a gradation correction curve computing process (step (c)) in FIG. 6 is performed. In this process, first, the measurement data (the density data and the colorimetry data) determined in the manner as mentioned above is fed to the gradation correction curve producing apparatus 400 shown in FIG. 5.

An input of those colorimetry data into the gradation correction curve producing apparatus 400 is performed, for example in such a way that an operator enters data through a key entry from the keyboard 23 of the personal computer 20 shown in FIG. 2. Or alternatively, in the event that the calorimeter used in the measurement has a function of outputting the measurement data in form of a signal, it is acceptable that the calorimeter is connected via a signal cable to the personal computer 20 shown in FIG. 2 so that the measurement data is fed to the personal computer 20 (that is, the gradation correction curve producing apparatus 400 shown in FIG. 5) as it is.

In a deviation correction curve computing process (step (c-1)) of the gradation correction curve computing process (step (c)) in FIG. 6, the deviation correction curve computing section 4121 in the gradation correction curve computing section 412 of the gradation correction curve producing apparatus 400 shown in FIG. 5 is operated.

The deviation correction curve computing section 4121 is provided with a memory 4121a storing a predetermined gradation correction standard curve for each monochrome.

With respect to the color printer 30 shown in FIG. 1, such color printers are individually slightly different in their characteristics even if the same type of printer device is concerned. Accordingly, even if the same gradation of image is printed out, there is a need to prepare gradation correction curves individually slightly different for each printer. Here, however, a type difference in printer device is disregarded, and there is prepared beforehand a gradation correction curve (this is referred to as the gradation correction standard curve) on a standard one of the same type as the color printer 30, and the gradation correction standard curves thus prepared are stored in the memory 4121a.

The deviation correction curve computing section 4121 determines a first gradation deviation correction curve for correcting a deviation between a first gradation correction curve for each monochrome obtained by the density measurement data of the monochrome density patch of the measurement data entered in the manner as mentioned above, and the gradation correction standard curves stored in the memory 4121a, and in addition determines a second gradation deviation correction curve for correcting a deviation between a second gradation correction curve for each monochrome obtained by the colorimetry data of the gray patch of the measurement data entered, and the gradation correction standard curves stored in the memory 4121a.

Figure 8:
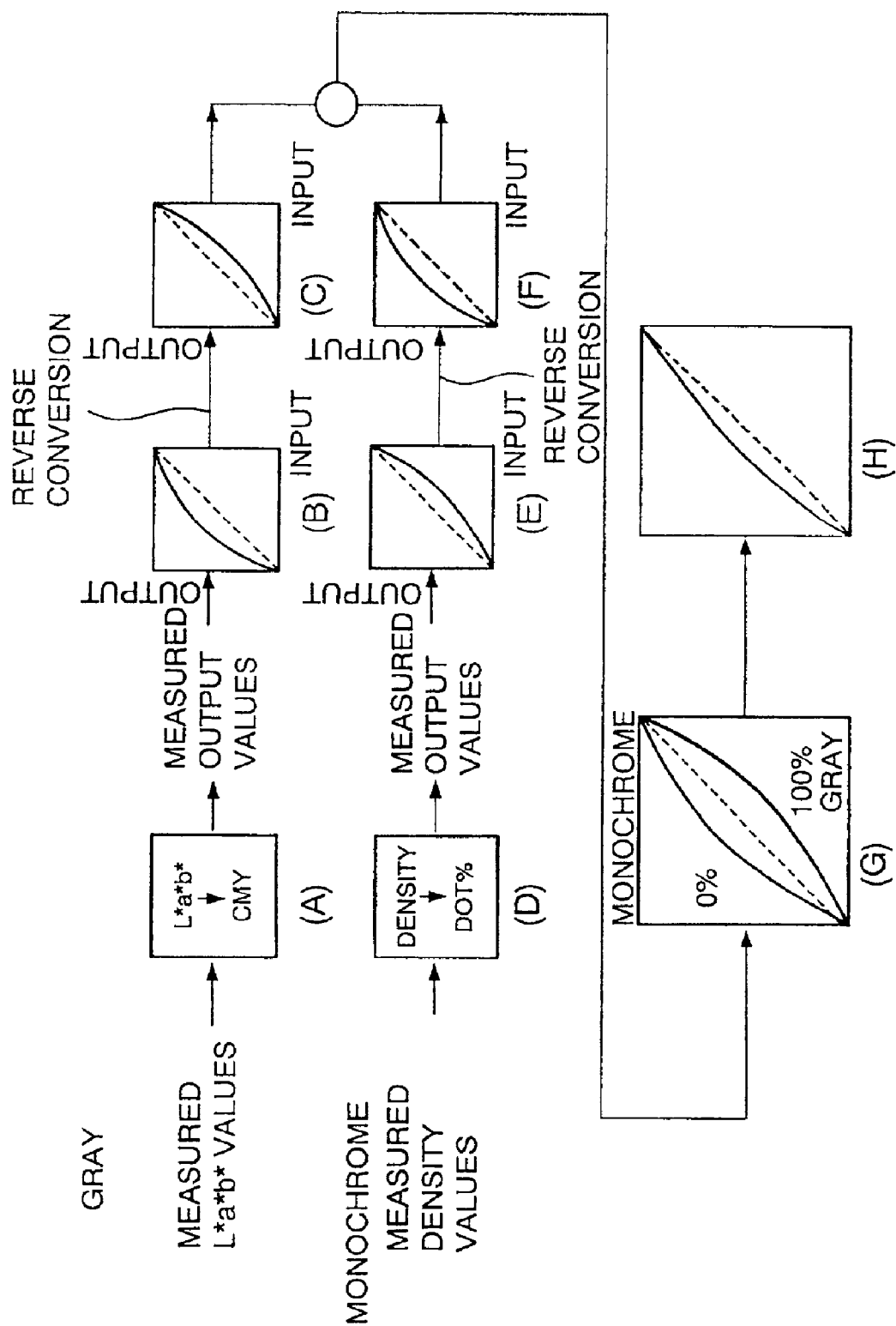
FIG. 8 is a typical illustration useful for understanding contents of processing in a process of computing the gradation correction curve.

FIG. 8 is a typical illustration useful for understanding contents of processing in a gradation correction curve computing process (step (c) in FIG. 6).

In the deviation correction curve computing process (step (c-1)) executed in the deviation correction curve computing section 4121 of the gradation correction curve computing section 412 of the gradation correction curve producing apparatus 400 shown in FIG. 5, as shown in part (A) of FIG. 8, colorimetry data (measured L*a*b* values) obtained through the actual measurement is converted into measured output values representative of monochromes of C, M, Y in accordance with a profile (the association between output data values of monochromes of C, M, Y on the color printer 30 and the color (L*a*b* values) on the obtained image) of the color printer 30.

The horizontal axis (input) of a part (B) of FIG. 8 denotes data (input data of the color printer 30) outputted directed to the color printer 30 after performing the gradation correction in accordance with the above-mentioned gradation correction standard curve. The vertical axis of the part (B) of FIG. 8 denotes the measure output values determined in the manner as mentioned above. Here, there is shown only a color of graph representing three colors of C, M, Y. In the graph of the part (B) of FIG. 8, in the event that the color printer 30 shown in FIG. 1 is a color printer having the standard characteristic as mentioned above, the relation between the input and the output of the part (B) of FIG. 8 would offer the linear relation as shown by the dotted line in the part (B) of FIG. 8. As a practical matter, however, the color printer 30 shown in FIG. 1 has characteristic somewhat different from the standard characteristic, and thus the relation between the input and the output of the part (B) of FIG. 8 offers the relation different from the linear relation as shown by the solid line in the part (B) of FIG. 8.

For this reason, next, as shown in a part (C) of FIG. 8, there is produced a curve opposite in relation to the part (B) of FIG. 8. When data (input data), which is subjected to the gradation correction in accordance with the gradation correction standard curve, is converted in accordance with the curve of the part (C) of FIG. 8 and then directed to the color printer 30, the color printer 30 outputs an image having color of the linear relation with respect to the data (input data) corrected in accordance with the gradation correction standard curve, as shown by the dotted line in the part (C) of FIG. 8. It is noted, however, that the curve of the part (C) of FIG. 8 is produced in accordance with the measured L*a*b* values of the gray patch, and thus it is not always expected that the color printer 30 outputs an image having the ideal linear relation. Details will be described later.

The curve shown by the solid line in the part (C) of FIG. 8 corresponds to an example of the second gradation deviation correction curve referred to in the present invention.

The above-mentioned matter relates to processing based on the colorimetry data of the gray patch. The same processing is applied also to the density measurement data of the density patches for the monochromes of C, M, Y. Treatment of the monochromatic patches of K (black) will be described later.

Here, as shown in a part (D) of FIG. 8, the measured density values of C, M, Y are converted into the measured output values representative of dot % of C, M, Y. To convert the measured density values into the measured output values representative of dot %, the formula of Murray-Davies set forth below is used.

$$\text{Dot \%} = \frac{1 - 10^{-D_R}}{1 - 10^{-D_V}} \times 100\% \qquad (1)$$

Where $D_R$ denotes a measured density value to be converted into dot %, and $D_V$ denotes a density value of a solid portion.

The horizontal axis (input) of a part (E) of FIG. 8 denotes, similar to the horizontal axis (input) of the part (B) of FIG. 8, data (input data of the color printer 30) outputted directed to the color printer 30 after performing the gradation correction in accordance with the above-mentioned gradation correction standard curve. The vertical axis of the part (E) of FIG. 8 denotes the measure output values representative of dot %, which is determined in accordance with the formula (1). Also here, similar to the part (B) of FIG. 8, there is shown only a color of graph representing three colors of C, M, Y.

In the graph of the part (E) of FIG. 8, similar to the part (B) of FIG. 8, in the event that the color printer 30 shown in FIG. 1 is a color printer having the standard characteristic as mentioned above, the relation between the input and the output of the part (E) of FIG. 8 would offer the linear relation as shown by the dotted line in the part (E) of FIG. 8. As a practical matter, however, the color printer 30 shown in FIG. 1 has characteristic somewhat different from the standard characteristic, and thus the relation between the input and the output of the part (E) of FIG. 8 offers the relation different from the linear relation as shown by the solid line in the part (E) of FIG. 8.

For this reason, next, as shown in a part (F) of FIG. 8, there is produced a curve opposite in relation to the part (E) of FIG. 8. When data (input data), which is subjected to the gradation correction in accordance with the gradation correction standard curve, is converted in accordance with the curve of the part (F) of FIG. 8 and then directed to the color printer 30, the color printer 30 outputs an image having color of the linear relation with respect to the data (input data) corrected in accordance with the gradation correction standard curve, as shown by the dotted line in the part (F) of FIG. 8. It is noted, however, that the curve of the part (F) of FIG. 8 is produced in accordance with the measured density values of the monochrome patch, and thus it is not always expected that the color printer 30 outputs an image having the ideal linear relation. The curve shown by the solid line in the part (F) of FIG. 8 corresponds to an example of the first gradation deviation correction curve referred to in the present invention.

Next, there is performed processing of the deviation correction curve internal division arithmetic section 4122 in the gradation correction curve computing section 412 of the gradation correction curve producing apparatus 400 shown in FIG. 5, that is, processing in the deviation correction curve internal division process (step (c-2)) of the gradation correction curve computing process (step (c)) in FIG. 6.

Here, weight of the internal division arithmetic operation is set up from the weight set up section 413 shown in FIG. 5 to the deviation correction curve internal division arithmetic section 4122 in accordance with operation of keyboard 22 or the mouse 23 (cf. FIG. 2).

The weight indicates, as shown in a part (G) of FIG. 8, a ratio of the internal division between a curve shown by the solid line in the part (C) of FIG. 8 and curves shown in the part (C) of FIG. 8 and the part (F) of FIG. 8 where the curve shown by the solid line in the part (F) of FIG. 8 is internally divided to produce a new curve. For example, when the weight 0% is indicated, the curve based on the gray patch of the part (C) of FIG. 8 is not adopted, but only the curve based on the monochromatic patch of the part (F) of FIG. 8 is adopted. When the weight 50% is indicated, the curves of the part (C) of FIG. 8 and the part (F) of FIG. 8 are equally used to perform the internal division arithmetic operation. When the weight 100% is indicated, the curve based on the monochromatic patch of the part (F) of FIG. 8 is not adopted, but only the curve based on the gray patch of the part (C) of FIG. 8 is adopted. The weight set up section 413 sets up the same weight on any of C, M, Y without any distinction of the monochromes of C, M, Y. The reason why this is to do so is that the same weight is sufficient and it saves an operator's trouble for setting up the weight.

The curve determined by the internal division arithmetic operation corresponds to an example of the third gradation deviation correction curve referred to in the present invention.

After the internal division as mentioned above is performed, there is performed processing of the standard curve control section 4123 in the gradation correction curve computing section 412 of the gradation correction curve producing apparatus 400 shown in FIG. 5, that is, processing in the standard curve control process (step (c-3)) of the gradation correction curve computing process (step (c)) in FIG. 6.

Here, as shown in a part (H) of FIG. 8, the curve determined by the weighting internal deviation of two curves of the part (C) of FIG. 8 and the part (F) of FIG. 8 is used to correct the gradation correction standard curve. The gradation correction curve obtained by this correction is, as will be understood from the flow of the processing shown in FIG. 8, a gradation correction curve, which is balanced with respect to both the monochromes of C, M, Y and the gray, and is suitable for the color printer 30 shown in FIG. 1.

The gradation correction curve thus determined is used, in the personal computer 20 shown in FIG. 1, for the gradation correction of the actual image data when an image is actually printed out by the color printer 30.

Incidentally, to produce the gradation correction curve of K (black), since there exists no information from the gray patch, the correction of the gradation correction standard curve for K is performed in the part (H) of FIG. 8 via the route for the monochromes of FIG. 8 (the flow of the parts (D), (E), and (F) of FIG. 8), omitting the processing of the part (G) of FIG. 8.

According to the present embodiment, objective data is obtained by the colorimetry with respect to not only the monochromes of C, M, Y but also the gray, so that the colorimetry data of the gray is reflected by the weighting internal division arithmetic operation. This feature needs no especial skill and makes it possible to readily produce the gradation correction curve. Further, according to the present embodiment, an operator can set up the weight so that the operator's way of thinking and desire for the gradation correction are adopted. Thus, it is possible to produce the gradation correction curve with great accuracy according to the operator.

Hereinafter, there will be described a gradation correction curve evaluation result display method and a gradation correction curve evaluation result display apparatus for displaying an evaluation result of a gradation correction curve to correct gradation of an image, and a gradation correction curve evaluation result display program storage medium storing a gradation correction curve evaluation result display program, when executed in a computer, which causes the computer to operate as the gradation correction curve evaluation result display apparatus, which are preferable when they are adopted in combination with the present invention as mentioned above.

Hitherto, it is performed that image data is taken into a personal computer and the like to be subjected to an edition of an image on the image data, and the image data subjected to the edition is subjected to a color conversion to meet characteristics of an image output apparatus of interest, such as a color printer, and further subjected to a gradation correction and the like, and then the image data is outputted to the image output apparatus so that the image output apparatus outputs a desired image.

In the personal computer and the like, the various sorts of processing as mentioned above are performed. particularly, in the gradation correction processing, there is performed such a processing that a gradation correction curve is defined in form of an LUT (look-up-table) for each of monochromes of for example cyan (C), magenta (M), yellow (Y) and black (K), and the image data of CMYK are converted in accordance with the associated gradation correction curves, respectively.

To make up such a gradation correction curve, the personal computer or the like is used to produce image data representative of a color chart consisting of a plurality of density patches on each of C, M, Y and K, and the image data thus produced are fed to an image output apparatus such as a color printer so that the image output apparatus outputs a color chart. Densities of density patches of C, M, Y and K constituting the outputted color chart thus outputted are measured. Association of the density measurement result of the density patches thus obtained with the values of the image data when the density patches are produced makes it possible to make up the gradation correction curve.

Hitherto, to evaluate gradation reproduction accuracy and the like of the gradation correction curve thus made up, in a similar fashion to that of making up the gradation correction curve, there is performed an evaluation in such a manner that the gradation correction curve thus produced is used to subject image data to a gradation correction processing, a color chart is outputted in accordance with the image data after the gradation correction processing, densities of density patches constituting the color chart are measured, the measured density values are converted into dot % in accordance with the formula of Murray-Davies, a difference between the dot % value (the measured dot % value) thus obtained and a predetermined dot % value (a target dot % value) is determined in form of an evaluation value and the evaluation value is displayed, and an operator performs an evaluation in accordance with the displayed evaluation value as to whether the produced gradation correction curve has a sufficient accuracy or needs a further fine control.

However, according to the above-mentioned conventional display method, while it is suitable for the control of dot % since data as to dot % is displayed, only the control of dot % is insufficient and there is a need to exactly adjust also the reproduction of a chromaticity value.

According to the prior art, an evaluation result of the chromaticity value is not obtained, and thus the chromaticity value is not displayed. For this reason, according to the prior art, accuracy of the gradation correction curve including the reproduction of the chromaticity value is evaluated through comprehensive judgement for the displayed data as to dot %.

However, according to such an evaluation method, a sophisticated skill is needed for performing an exact evaluation, and there is a possibility that it is difficult to expect an exact evaluation. Thus, finally, to obtain the gradation correction curve with great accuracy, a lot of time and labor is needed.

In view of the foregoing, hereinafter, there will be described a gradation correction curve evaluation result display method and a gradation correction curve evaluation result display apparatus making it easy to perform an evaluation of a gradation correction curve, and a gradation correction curve evaluation result display program storage medium storing a gradation correction curve evaluation result display program, when executed in a computer, which causes the computer to operate as the gradation correction curve evaluation result display apparatus.

Figure 9:
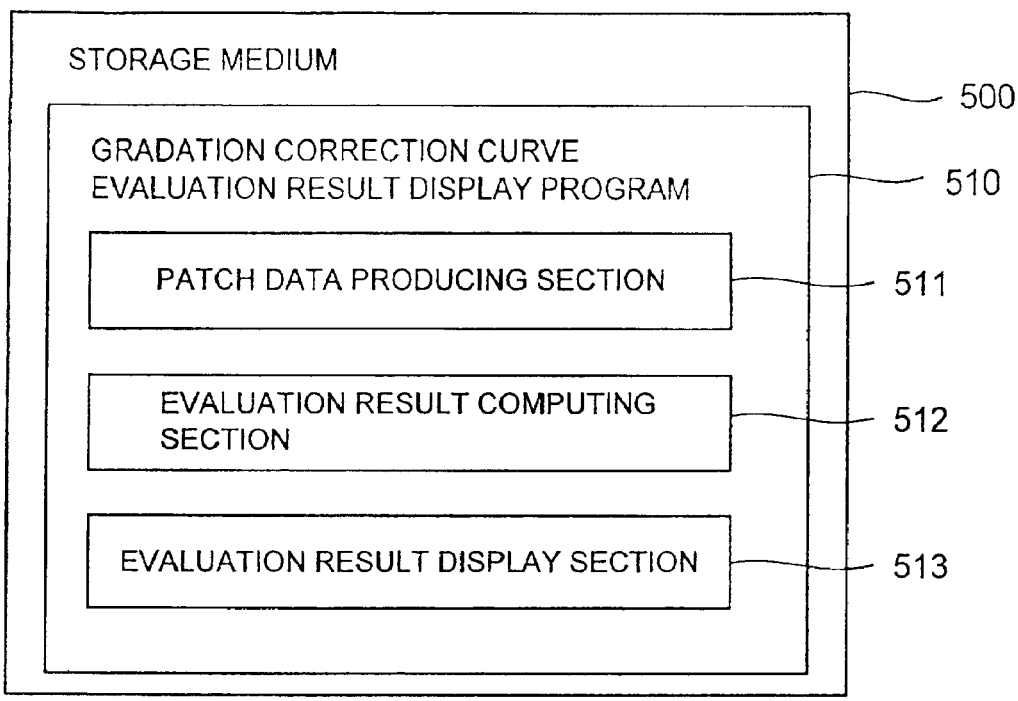
FIG. 9 is a view showing a first embodiment of a gradation correction curve evaluation result display program storage medium.

FIG. 9 is a view showing a first embodiment of a gradation correction curve evaluation result display program storage medium. The gradation correction curve evaluation result display program storage medium shown in FIG. 9 represents storage medium such as the CD-ROM 110 shown in FIG. 3 and the hard disk in the hard disk unit 213.

A gradation correction curve evaluation result display program storage medium 500 stores a gradation correction curve evaluation result display program 510 comprising a patch data producing section 511, an evaluation result computing section 512, and an evaluation result display section 513. Operations of the respective sections of the gradation correction curve evaluation result display program 510 will be described later.

Figure 10:
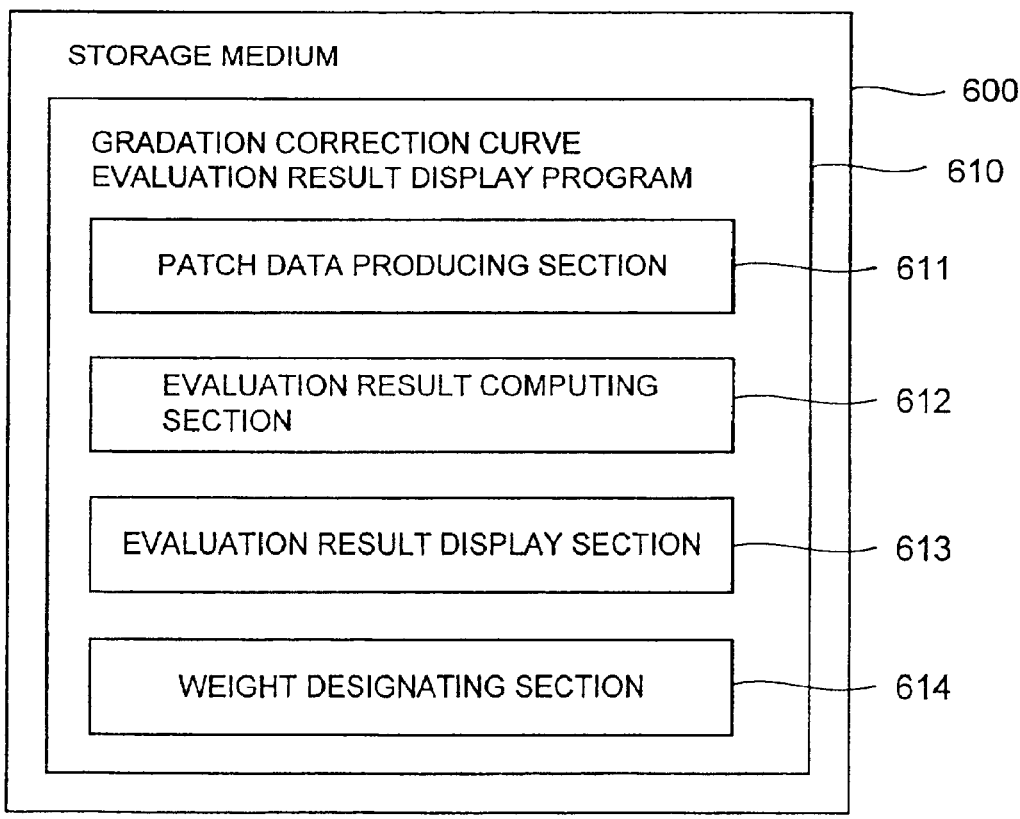
FIG. 10 is a view showing a second embodiment of a gradation correction curve evaluation result display program storage medium.

FIG. 10 is a view showing a second embodiment of a gradation correction curve evaluation result display program storage medium. The gradation correction curve evaluation result display program storage medium shown in FIG. 10 represents also storage medium such as the CD-ROM 110 shown in FIG. 3 and the hard disk in the hard disk unit 213.

A gradation correction curve evaluation result display program storage medium 600 stores a gradation correction curve evaluation result display program 610 comprising a patch data producing section 611, an evaluation result computing section 612, an evaluation result display section 613 and a weight designating section. Operations of the respective sections of the gradation correction curve evaluation result display program 610 will be described later.

When any one of the gradation correction curve evaluation result display programs 510 and 610 stored in the gradation correction curve evaluation result display program storage media 500 and 600 shown in FIGS. 9 and 10 is stored in the CD-ROM 110 shown in FIG. 3, the CD-ROM 110 corresponds to an example of the gradation correction curve evaluation result display program storage medium, and when the gradation correction curve evaluation result display program stored in the CD-ROM 110 is loaded onto the personal computer 20 and stored in the hard disk unit 213, the hard disk storing the gradation correction curve evaluation result display program corresponds to an example of the gradation correction curve evaluation result display program storage medium. Further, when the gradation correction curve evaluation result display program within the hard disk is down loaded onto the floppy disk 100 shown in FIG. 3, the floppy disk storing the gradation correction curve evaluation result display program also corresponds to an example of the gradation correction curve evaluation result display program storage medium.

Figure 11:
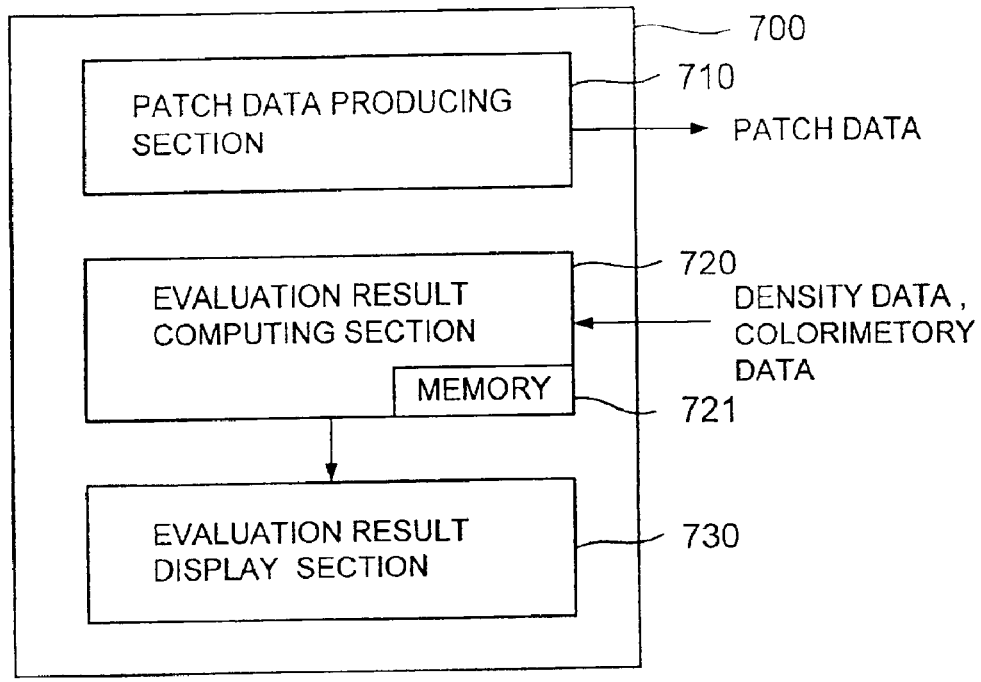
FIG. 11 is a functional block diagram of a first embodiment of a gradation correction curve evaluation result display unit.

FIG. 11 is a functional block diagram of a first embodiment of a gradation correction curve evaluation result display unit.

A gradation correction curve evaluation result display unit 700 shown in FIG. 11 is implemented when the gradation correction curve evaluation result display program 510 shown in FIG. 9 is loaded onto the personal computer 20 and is executed by the personal computer 20.

The gradation correction curve evaluation result display unit 700 shown in FIG. 11 comprises a patch data producing section 710, an evaluation result computing section 720, and an evaluation result display section 730.

The patch data producing section 710, the evaluation result computing section 720, and the evaluation result display section 730, which constitute the gradation correction curve evaluation result display unit 700 shown in FIG. 11, comprise the combinations of the patch data producing section 510, the evaluation result computing section 520, and the evaluation result display section 530, which are shown in FIG. 9 as software parts, with the hardware of the personal computer 20 and the operating systems (OS), respectively.

Figure 12:
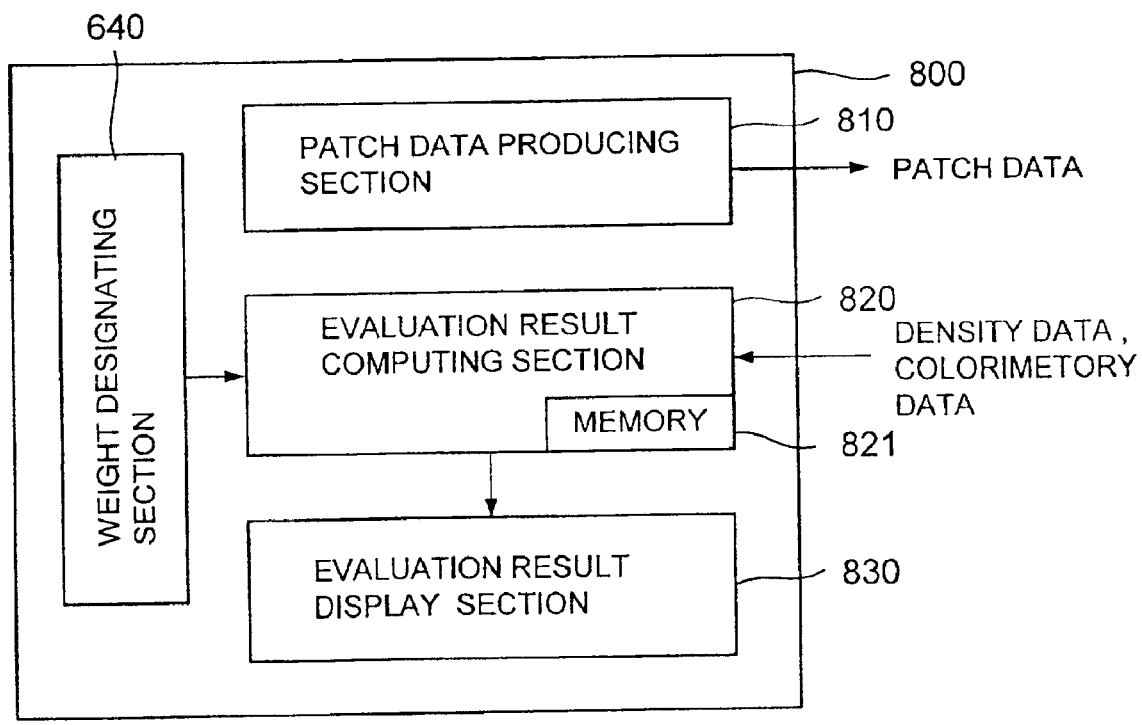
FIG. 12 is a functional block diagram of a second embodiment of a gradation correction curve evaluation result display unit.

FIG. 12 is a functional block diagram of a second embodiment of a gradation correction curve evaluation result display unit.

A gradation correction curve evaluation result display unit 800 shown in FIG. 12 is implemented when the gradation correction curve evaluation result display program 610 shown in FIG. 10 is loaded onto the personal computer 20 and is executed by the personal computer 20.

The gradation correction curve evaluation result display unit 800 shown in FIG. 12 comprises a patch data producing section 810, an evaluation result computing section 820, an evaluation result display section 830, and a weight designating section 840.

Also in the gradation correction curve evaluation result display unit 800 shown in FIG. 12, in a similar fashion to that of FIG. 11, the patch data producing section 810, the evaluation result computing section 820, the evaluation result display section 730, and the weight designating section 840, which constitute the gradation correction curve evaluation result display unit 800 shown in FIG. 12, comprise the combinations of the patch data producing section 610, the evaluation result computing section 620, the evaluation result display section 630, and the weight designating section 840, which are shown in FIG. 10 as software parts, with the hardware of the personal computer 20 and the operating systems (OS), respectively.

Figure 13:
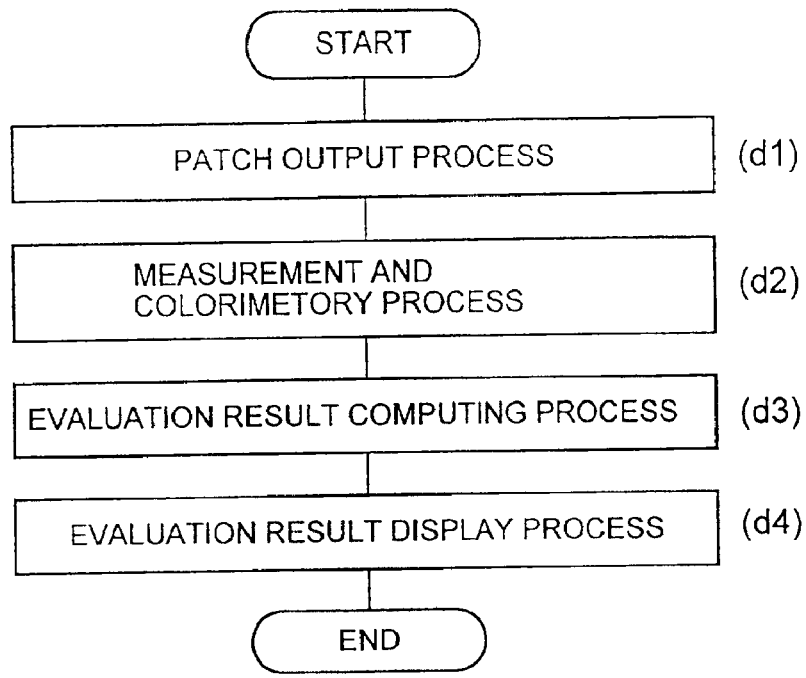
FIG. 13 is a flowchart useful for understanding a first embodiment of a gradation correction curve evaluation result display method.
Figure 14:
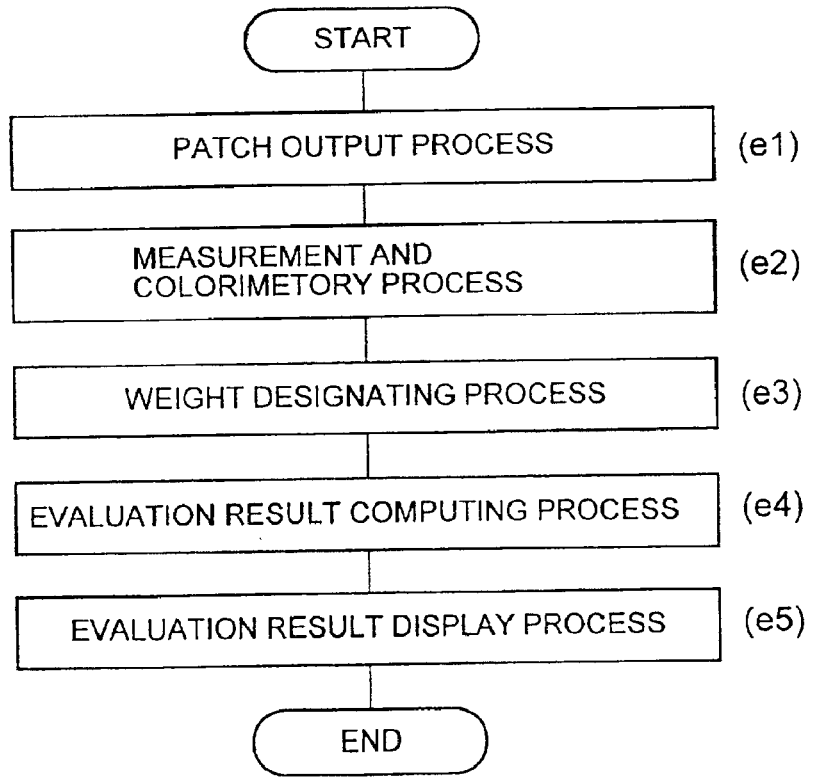
FIG. 14 is a flowchart useful for understanding a second embodiment of a gradation correction curve evaluation result display method.
Figure 15:
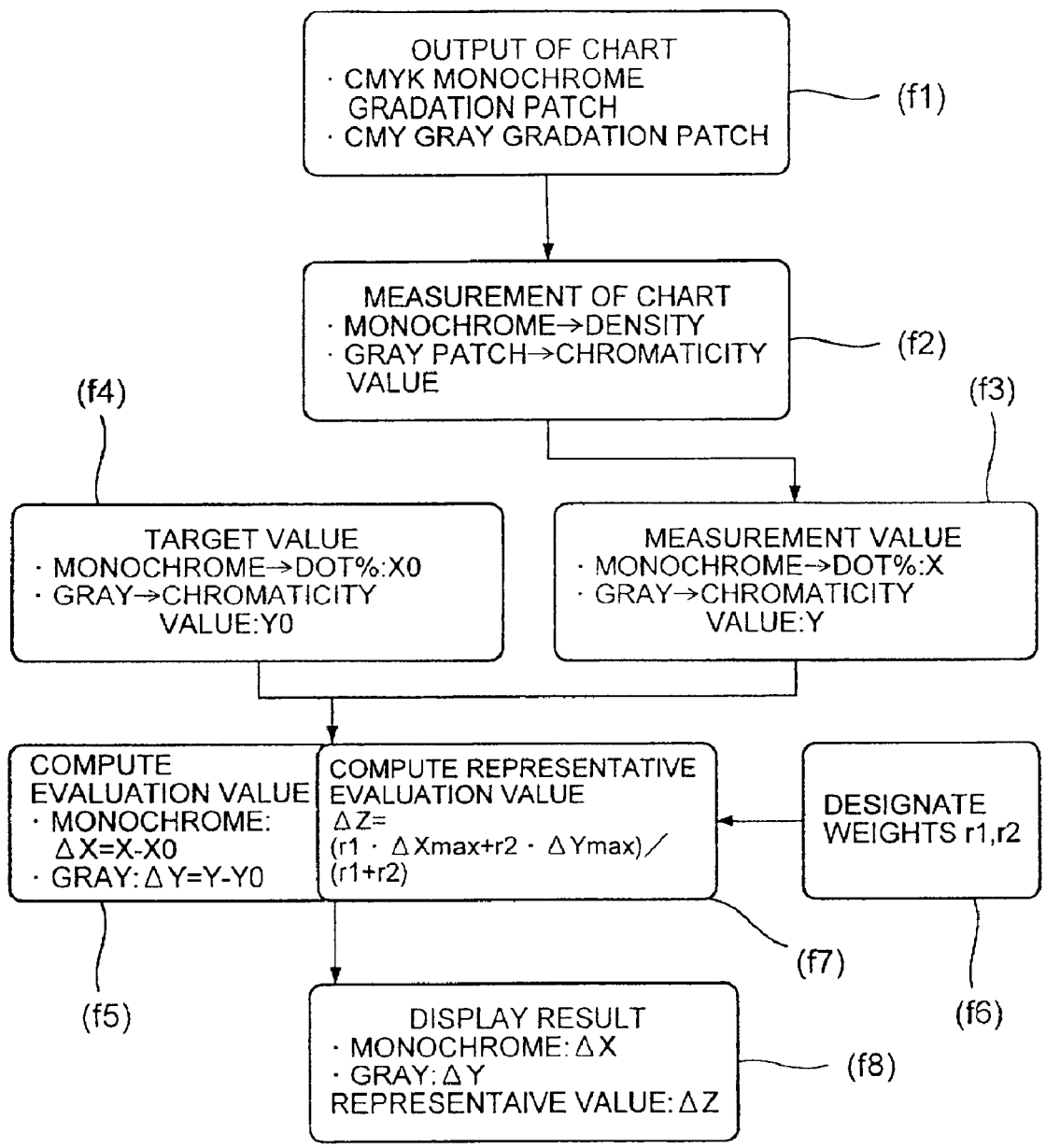
FIG. 15 is a flowchart in which the flowcharts shown in FIGS. 13 and 14 are combined.

FIG. 13 is a flowchart useful for understanding a first embodiment of a gradation correction curve evaluation result display method, wherein the gradation correction curve evaluation result display unit 700 shown in FIG. 11 is used to evaluate the gradation correction curve, and the evaluation result is displayed. FIG. 14 is a flowchart useful for understanding a second embodiment of a gradation correction curve evaluation result display method, wherein the gradation correction curve evaluation result display unit 800 shown in FIG. 12 is used to evaluate the gradation correction curve, and the evaluation result is displayed. FIG. 15 is a flowchart in which the flowcharts shown in FIGS. 13 and 14 are combined.

In the explanation of the flowchart of FIG. 15, there will be explained the respective steps of the flowcharts of FIGS. 13 and 14, and the respective sections of the gradation correction curve evaluation result display units 700 and 800 shown in FIGS. 11 and 12, respectively (accordingly, the respective sections of the gradation correction curve evaluation result display program storage media 500 and 600 shown in FIGS. 9 and 10, respectively).

First, in a step (f1) of FIG. 15, an output of a color chart is performed. This corresponds to the patch output processes (the step (d1) and the step (e1)) in FIGS. 13 and 14. In the step (f1), the patch data producing sections 710 and 810 of FIGS. 11 and 12 are operated to produce patch data to output color charts in which patches based on the patch data are lined. That is, the patch data producing sections 710 and 810 of the gradation correction curve evaluation result display units 700 and 800 shown in FIGS. 11 and 12 produce monochromatic patch data representative of a plurality of monochromatic density patches for each of the monochromes of C, M, Y, and gray patch data representative of a plurality of gray density patches as to a gray in which the monochromes of C, M, Y are combined. Further, according to the present embodiment, the patch data producing sections 710 and 810 produce monochromatic patch data representative of a plurality of monochromatic density patches for the monochrome of K (black) as well as the monochromes of C, M, Y.

Those patch data thus produced are transmitted to the color printer 30 shown in FIG. 1. The color printer 30 outputs a color chart consisting of a large number of patches in accordance with the received patch data.

FIG. 7, as mentioned above, shows an example of the color chart thus outputted. In FIG. 7, there are formed 21 steps of density patches for each of the monochromes of C, M, Y, K and 13 steps of density patches for a gray as the combined color of C, M, Y.

Next, in a step (f2) in FIG. 15, there is performed a measurement of the color chart. The step (f2) in FIG. 15 corresponds to the measurement and colorimetry processes (step (d2), step (e2)) in FIGS. 13 and 14).

This measurement itself is a work that an operator performs using for example a colorimeter with a density measurement mode, apart from the gradation correction curve evaluation result display units 700 and 800 shown in FIGS. 11 and 12.

Here, with respect to the patches for the respective monochromes of C, M, Y, K of the color chart shown in FIG. 7, densities of the respective monochromes are measured to determine density values for the patches. And with respect to the patches for the gray, a colorimetry is performed to determine chromaticity values of L*a*b* for each patch.

Next, in a step (f3) in FIG. 15, first, the measurement data (the density data and the colorimetry data) determined in the manner as mentioned above is fed to the gradation correction curve evaluation result display units 700 and 800 shown in FIGS. 11 and 12.

An input of those measured data into the gradation correction curve evaluation result display units 700 and 800 is performed, as mentioned above, for example in such a way that an operator enters data through a key entry from the keyboard 23 of the personal computer 20 shown in FIG. 2. Or alternatively, in the event that the calorimeter used in the measurement has a function of outputting the measurement data in form of a signal, it is acceptable that the colorimeter is connected via a signal cable to the personal computer 20 shown in FIG. 2 so that the measurement data is fed to the personal computer 20 (that is, the gradation correction curve evaluation result display units 700 and 800 shown in FIGS. 11 and 12) as it is.

Next, the measured density values of C, M, Y are converted into the measured output values representative of dot % of C, M, Y. To convert the measured density values into the measured output values representative of dot %, the formula of Murray-Davies set forth below is used.

$$\text{Dot \%} = \frac{1 - 10^{-D_R}}{1 - 10^{-D_V}} \times 100\% \quad (1)$$

Where $D_R$ denotes a measured density value to be converted into dot %, and $D_v$ denotes a density value of a solid portion.

Here, the dot % value is representatively expressed by X, and the chromaticity value of L*a*b* obtained through the colorimetry on the gray patch is representatively expressed by Y.

On the other hand, in a step (f4) of FIG. 15, a target value (this is representatively denoted by X0) of the dot % value associated with the gradation correction standard curve and a target value (this is representatively denoted by Y0) of the chromaticity value are prepared beforehand for computation of the following evaluation value.

Here, the gradation correction standard curve will be described again.

With respect to the color printer 30 shown in FIG. 1, such color printers are individually slightly different in their characteristics even if the same type of printer device is concerned. Accordingly, even if the same gradation of image is printed out, there is a need to prepare gradation correction curves individually slightly different for each printer. Here, however, a type difference in printer device is disregarded, and there is prepared beforehand a gradation correction curve on a standard one of the same type as the color printer 30. Such a gradation correction curve thus prepared is referred to as the gradation correction standard curve.

Data representative of the color chart, which is subjected to the gradation correction curve using the gradation correction standard curve, is transmitted to the color printer of the standard characteristic to output the color chart as shown in FIG. 7. The dot % value obtained in such a manner that a density value, wherein the color chart is measured by a calorimeter free from an error, is converted in accordance with the formula (1), and the chromaticity value obtained in such a manner that the color chart is measured by the calorimeter, correspond to the target value of the dot % value and the target value of the chromaticity value, respectively. The dot % value and the chromaticity value as those target values are not mutually independent and are mutually convertible by a profile of a color printer. The profile of a color printer implies the association between data values (dot % values) of monochromes of C, M, Y to be entered into the color printer and colors (chromaticity values) on an image obtained by the color printer in accordance with the data.

Memories 721 and 821 of the evaluation result computing sections 720 and 820 of the gradation correction curve evaluation result display units 700 and 800 shown in FIGS. 11 and 12 store the gradation correction standard curve, the target value of the dot % value and the target value of the chromaticity value, and the profile of the color printer.

In a step (f5) of FIG. 15, there are determined deviations $\Delta X = X - X0$, $\Delta Y = Y - Y0$ between the dot % value X, the chromaticity value Y, which are obtained in the step (f3), and the target value X0 of the dot % value and the target value Y0 of the chromaticity value, which are obtained in the step (f4), respectively.

The steps (f3), (f4) and (f5) of FIG. 15 correspond to the evaluation result computing process (step (d3)) in the flowchart shown in FIG. 13. The processing is carried out by the evaluation result computing section 720 of the gradation correction curve evaluation result display unit 700 shown in FIG. 11.

The step (f6) of FIG. 15 correspond to the weight designation process (step (e3)) in the flowchart shown in FIG. 14. The processing is carried out by the weight designating section 840 of the gradation correction curve evaluation result display unit 800 shown in FIG. 12.

The weight designating section 840 designates weights r1 and r2 of weighting mean, which will be described hereinafter, in accordance with an operation of the keyboard 23 or the mouse 24 (cf. FIG. 2) by an operator.

In a step (f7) of FIG. 15, there are determined the maximum values $\Delta X\text{max}$, $\Delta Y\text{max}$ of the deviations $\Delta X$, $\Delta Y$ determined in the step (f5), and the weighting mean between the maximum values $\Delta X\text{max}$ and $\Delta Y\text{max}$, that is, $$\Delta Z = (r1 \cdot \Delta X\text{max} + r2 \cdot \Delta Y\text{max})/(r1 + r2) \quad (2)$$

is determined.

As described above, in the step (f7), the weighting mean between the maximum values $\Delta X\text{max}$ and $\Delta Y\text{max}$ is determined. Where $\Delta X\text{max}$ denotes dot % value, and $\Delta Y\text{max}$ denotes the chromaticity value. Accordingly, in the step (f7), one of the maximum values $\Delta X\text{max}$ and $\Delta Y\text{max}$ is converted into another and then the weighting mean is performed.

The conversion from one to another, or the conversion between the chromaticity value and C, M, Y values, is performed in accordance with the profile of the color printer.

The steps (f3), (f4) (f5) and (f7) of FIG. 15 correspond to the evaluation result computing process (the step (e4)) in the flowchart shown in FIG. 14. The processing is carried out by the evaluation result computing section 820 of the gradation correction curve evaluation result display unit 800 shown in FIG. 12.

In a step (f8) of FIG. 15, the evaluation values $\Delta X$, $\Delta Y$ computed in the step (f5), or the representative evaluation value $\Delta Z$ computed in the step (f7), are displayed on the display screen 22a of the image display unit 22 of the computer 20 shown in FIG. 2.

Of the step (f8) of FIG. 15, the display of the evaluation values $\Delta X$, $\Delta Y$ corresponds to the evaluation result display process (step (d4)) in the flowchart shown in FIG. 13. The display processing is carried out by the evaluation result display section 730 of the gradation correction curve evaluation result display unit 700 shown in FIG. 11. Of the step (f8) of FIG. 15, the display of the representative evaluation value $\Delta Z$ corresponds to the evaluation result display process (step (e5)) in the flowchart shown in FIG. 14. The display processing is carried out by the evaluation result display section 830 of the gradation correction curve evaluation result display unit 800 shown in FIG. 12.

Figure 16:
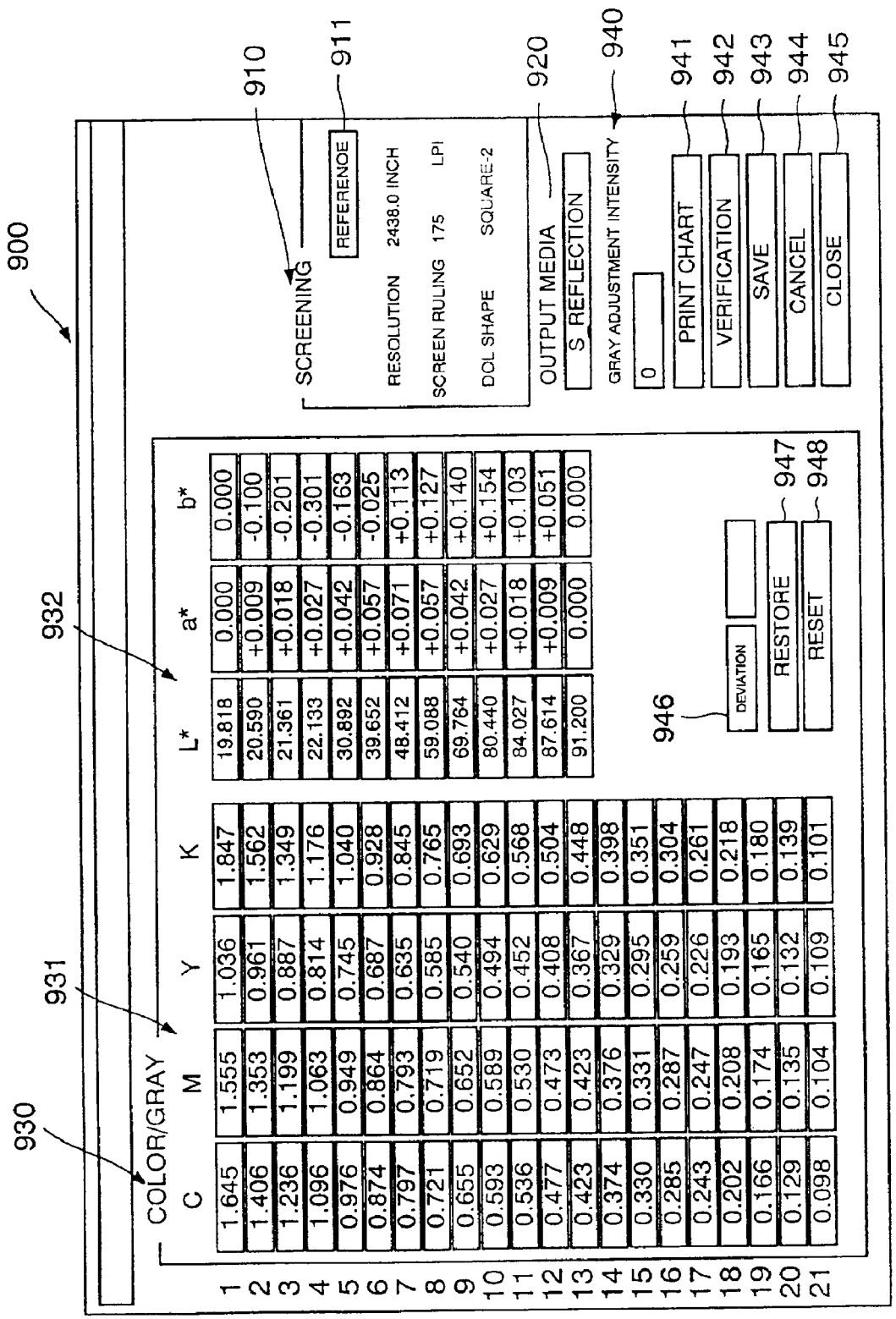
FIG. 16 is an illustration showing an example of an operating screen.

FIG. 16 is an illustration showing an example of an operating screen on which the representative evaluation value $\Delta Z$ explained referring to FIG. 15 is displayed.

When a predetermined operation is performed through the keyboard 23 or the mouse 24, an operating screen 900 shown in FIG. 16 is displayed on the display screen 22a of the image display unit 22 of the computer 20 shown in FIG. 2.

Thus, first, when the mouse 24 is operated to click a Reference button 911 of a column 910 of a Screening on the operating screen 900, there appears an image output condition designation screen (not illustrated) on the display screen 22a of the image display unit 22. An operator selects on the image output condition designation screen through the mouse operation an image output condition, which consists of resolution of the color printer 30, ruling per unit length, a dot shape, an angle, etc. Thus, the selected image output condition is displayed on the column 910 of the Screening on the operating screen 900.

On a column 920 of an output media on the operating screen 900 shown in FIG. 16, an operator selects a combination of a sort of sheet to be used for an image output and a sort of ink for an image recording. Those sorts of sheet and ink also constitute a part of the image output condition.

On columns 931 of CMYK and columns 932 of L*a*b* of a column 930 of color/gray appearing in the left hand of FIG. 16, first, there are displayed 21 steps of density values for each of monochromes of C, M, Y, K, and 13 steps of chromaticity values for L*a*b*, which represent the gradation correction standard curve associated with the image output condition designated in the manner as mentioned above.

When a button 941 of the print chart on the operating screen 900 shown in FIG. 16 is clicked through the mouse operation, the personal computer 20 produces image data representative of the color chart consisting of 21 steps (step 1 to step 21) of the density patches for each of colors of C, M, Y, K, and 13 steps (step 1 to step 13) of the density patches for a gray (achromatic color), and transmits the same to the color printer 30. The color printer 30 outputs the color chart (cf. FIG. 7) in accordance with the image data thus produced. This corresponds to the step (f1) of FIG. 15.

When the density or the color of each of the patches constituting the outputted color chart is measured, so that the measured data is entered into the personal computer 20, the measured data is displayed on the columns 931 of CMYK and the columns 932 of L*a*b* in FIG. 16.

Here, the gradation correction standard curve, which is stored beforehand in accordance with the measured data thus entered, is corrected, so that a gradation correction curve suitable for the color printer 30 is produced.

While it is possible to correct the gradation correction standard curve in accordance with only data for C, M, Y, K, here, the correction of the gradation correction standard curve is performed in accordance with data for C, M, Y, K, and data for L*a*b* as well for the purpose of providing a correction with greater accuracy. A degree of taking the data for L*a*b* into consideration to the data for C, M, Y, K is adjusted by means of entering a numerical value within 0% to 100% to a column 940 of a gray adjustment intensity. The numerical values of 0% to 100% are "weight" to be designated by the weight designating section 840 shown in FIG. 12.

Thereafter, when a button 943 of a save is clicked through the mouse operation, the gradation correction curve suitable for the color printer 30, which is obtained through the correction of the gradation correction standard curve in accordance with the entered data, is saved in association with the image output condition designated in the column 910 of the screening and the column 920 of the output media.

A button 942 of a verification is clicked, there is displayed an evaluation value display screen shown in FIG. 17 which will be described later.

When a button 946 of a deviation is clicked, the representative evaluation value ΔZ, which is explained referring to FIG. 15, is displayed on a column in right side. Form this value, it is possible to judge as to whether the present measurement is correct or not.

A cancel button 944 serves as a button for closing the operating screen 900 without preserving data entered or altered on the operating screen 900. A close button 945 serves as a button for closing the screen of FIG. 16 when nothing is altered on the screen of FIG. 16 since the screen of FIG. 16 is opened. A restore button 947 serves as a button for canceling an operation performed since the screen of FIG. 16 is opened, while the screen of FIG. 16 is opened. A reset button 948 serves as a button for resetting the gradation correction curve in the image output condition designated in the column 910 of the screening and the column 920 of the output media to a state of the gradation correction standard curve stored beforehand with respect to the image output condition.

Figure 17:
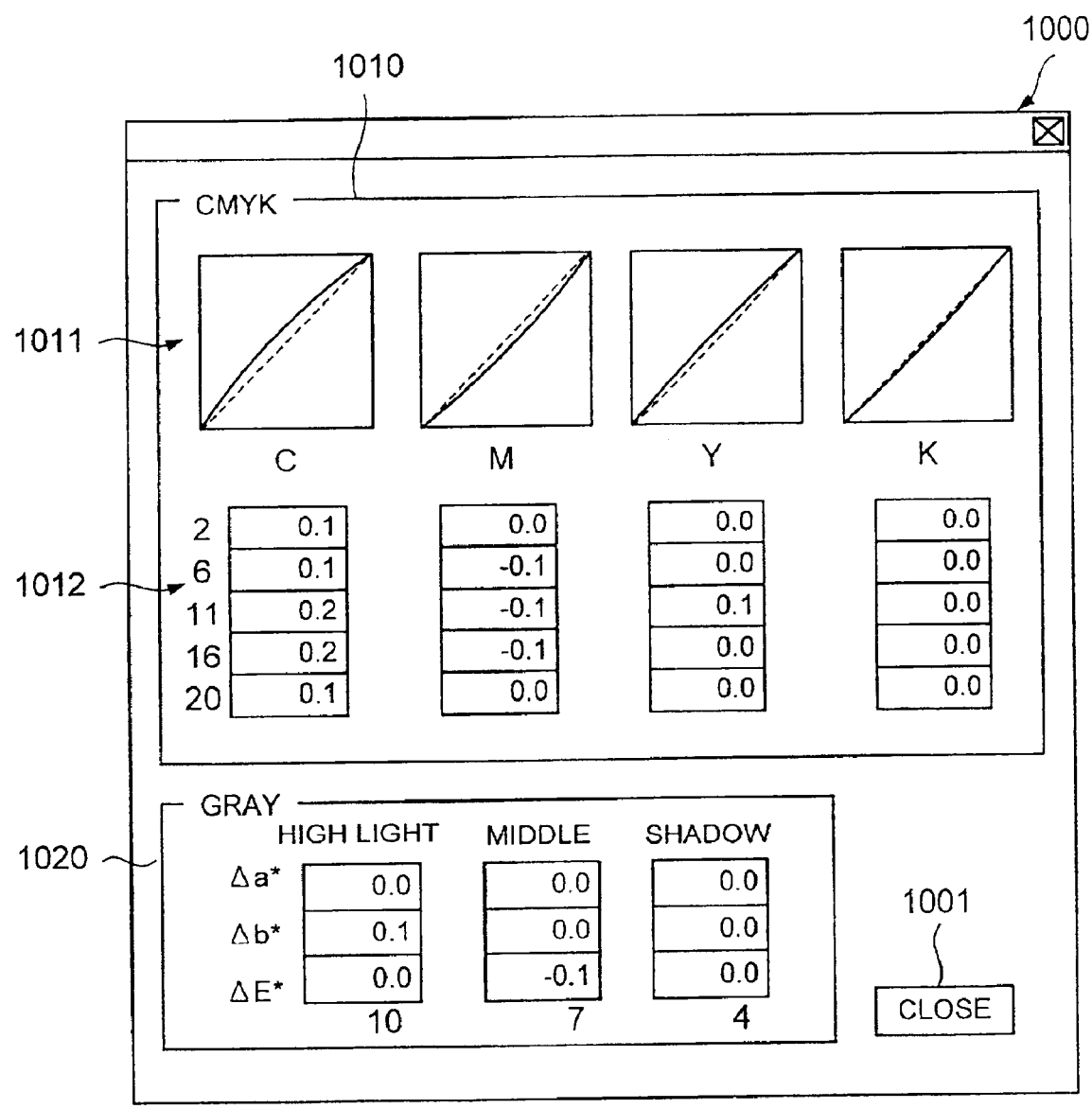
FIG. 17 is an illustration showing an example of an evaluation value display screen.

FIG. 17 is an illustration showing an example of an evaluation value display screen.

An evaluation value display screen 1000 shown in FIG. 17 is displayed, as mentioned above, when the verification button 942 is clicked on the screen of FIG. 16.

The evaluation value display screen 1000 shown in FIG. 17 is divided into two parts of a display section 1010 for CMYK and a display section 1020 for a gray. The display section 1010 for CMYK has a display section 1011 for graphs and a display section 1012 for numerical values. In the display section 1011 for graphs, the gradation correction standard curves for C, M, Y, K are drawn in form of an oblique line (a broken line), and further curves (solid lines) each having the deviation ΔX=X−X0 (cf. FIG. 15) of the steps 1 to 21 (cf. FIG. 7) of the color chart are drawn. In the display section 1012 for numerical values, the deviations ΔX=X−X0 on the steps 2, 6, 11, 16 and 20 (cf. FIG. 7) of the color chart for each of monochromes of C, M, Y, K are displayed in a numerical value. Confirmation of those curves and numerical values makes it possible to verify an accuracy of a gradation correction curve on a density (that is, dot %) for each of monochromes of C, M, Y, K.

In the display section 1020 for a gray of the evaluation value display screen 1000 shown in FIG. 17, there are displayed deviations ΔY (cf. FIG. 15) from the target value Y0 of a chromaticity value, of chromaticity values Y measured on the patch (step 10) of the high light, the patch (step 7) of the middle density, and the patch (step 4) of the shadow, of the 13 steps of gray patches shown in FIG. 7. Specifically, here, there are displayed deviation Δa*, deviation Δb*, and color difference ΔE between the measured chromaticity value Y and the target value of the chromaticity value.

Confirmation of numerical values in the display section 1020 for a gray makes it possible to verify an accuracy of a gradation correction curve on a chromaticity value.

When a close button 1001 is clicked through a mouse operation, the evaluation value display screen 1000 shown in FIG. 17 disappears, and the operating screen of FIG. 16 appears again.

The above-mentioned gradation correction curve evaluation result display method, gradation correction curve evaluation result display apparatus, and gradation correction curve evaluation result display program storage medium can be summarized as follows.

There is provided, of a gradation correction curve evaluation result display method, a first gradation correction curve evaluation result display method of displaying an evaluation result of a gradation correction curve for correcting a gradation of an image, said gradation correction curve evaluation result display method comprising:

a patch output step of outputting a plurality of monochromatic density patches for each of monochromes, and a plurality of gray density patches for a gray in which the monochromes are combined;

a measurement and colorimetry step of measuring density of the plurality of monochromatic density patches, and performing a colorimetry of the plurality of gray density patches;

an evaluation result computing step of determining both a first evaluation result of the gradation correction curve, which is determined from a density value obtained through measuring density of the plurality of monochromatic density patches, and a second evaluation result of the gradation correction curve, which is determined from a chromaticity value obtained through the colorimetry of the plurality of gray density patches; and an evaluation result display step of displaying both the first evaluation result and the second evaluation result determined in said evaluation result computing step.

According to the first gradation correction curve evaluation result display method as mentioned above, for example, both an evaluation result of a gradation correction curve based on the density value obtained by the density measurement through measuring density of monochromatic density patches for C, M, Y, (or an evaluation result by a density value or a dot % value determined through conversion of the density value), and an evaluation result of a gradation correction curve obtained by a colorimetry through color-measuring a gray of density patch of a combined color of C, M, Y, (or an evaluation result by a chromaticity value), and both the evaluation results are displayed. This feature makes it possible for an operator to suitably perform an evaluation referring to both the evaluation result by the density value or the dot % and the evaluation result by the chromaticity value, so that the operator makes a suitable judgement. Thus, it is possible to readily make up a gradation correction curve with great accuracy.

In the first gradation correction curve evaluation result display method as mentioned above, it is acceptable that said evaluation result display step displays the first evaluation result and the second evaluation result with numerical values and/or graphs.

Further, in the first gradation correction curve evaluation result display method as mentioned above, it is preferable that said evaluation result computing step determines, as the first evaluation result, a deviation between the density value obtained through measuring density of the plurality of monochromatic density patches and a predetermined standard density value for each monochrome, and also determines, as the second evaluation result, a deviation between the chromaticity value obtained through the colorimetry of the plurality of gray density patches and a predetermined standard chromaticity value.

Preparing standards values (the standard density value and the standard chromaticity value) beforehand and establishing the deviations from the standard density value and the standard chromaticity value in form of the evaluation results make it possible to perform a suitable evaluation.

Further, there is provided, of a gradation correction curve evaluation result display method, a second gradation correction curve evaluation result display method of displaying an evaluation result of a gradation correction curve for correcting a gradation of an image, said gradation correction curve evaluation result display method comprising:

a patch output step of outputting a plurality of monochromatic density patches for each of monochromes, and a plurality of gray density patches for a gray in which the monochromes are combined;

a measurement and colorimetry step of measuring density of the plurality of monochromatic density patches, and performing a colorimetry of the plurality of gray density patches;

an evaluation result computing step of determining a third evaluation result formed by combination of both a first evaluation result of the gradation correction curve, which is determined from a density value obtained through measuring density of the plurality of monochromatic density patches, and a second evaluation result of the gradation correction curve, which is determined from a chromaticity value obtained through the colorimetry of the plurality of gray density patches; and an evaluation result display step of displaying the third evaluation result determined in said evaluation result computing step.

According to the second gradation correction curve evaluation result display method as mentioned above, there is determined and displayed the third evaluation result formed by combination of both the first evaluation result (an evaluation result by a density value or a dot % value), and the second evaluation result (an evaluation result by a chromaticity value). This point is different from the first gradation correction curve evaluation result display method as mentioned above, in which there are determined and displayed both the first evaluation result (an evaluation result by a density value or a dot % value), and the second evaluation result (an evaluation result by a chromaticity value). The third evaluation result includes information as to both the first evaluation result (an evaluation result by a density value or a dot % value), and the second evaluation result (an evaluation result by a chromaticity value). Thus, it is possible to make suitable evaluation and judgement with less information of the third evaluation result instead of the first evaluation result and the second evaluation result.

In the second gradation correction curve evaluation result display method as mentioned above, it is preferable that said evaluation result computing step adopts, as the first evaluation result, the maximum value of a deviation between a density value for each of the monochromes obtained through density measurements for a plurality of monochromatic density patches and a predetermined standard density value for each monochrome, and also adopts, as the second evaluation result, the maximum value of a deviation between a chromaticity value obtained through colorimetry for a plurality of gray density patches and a predetermined standard chromaticity value, and determines an evaluation value as the third evaluation result in accordance with both the maximum values as mentioned above. In this case, it is preferable that the second gradation correction curve evaluation result display method further comprises a weight designating step of designating weight between the first evaluation result and the second evaluation result, and said evaluation result computing step determines the evaluation value as the third evaluation result by means of combining both the maximum values using the weight designated by said weight designating step.

As mentioned above, in the event that the evaluation value as the third evaluation result is determined in accordance with both the maximum value of the deviation by the density value or the dot % value and the maximum value of the deviation by the chromaticity value (for example, weight is designated and weight mean with the designated weight is applied), it is possible to obtain the evaluation value indicating the maximum deviation from the standard value taking both the density value or the dot % value and the chromaticity value into consideration, and thus it is useful for making a suitable judgement.

There is provided, of a gradation correction curve evaluation result display apparatus, a first gradation correction curve evaluation result display apparatus for displaying an evaluation result of a gradation correction curve for correcting a gradation of an image, said gradation correction curve evaluation result display apparatus comprising:

a patch data producing section for producing monochromatic patch data representative of a plurality of monochromatic density patches for each of monochromes, and gray patch data representative of a plurality of gray density patches for a gray in which the monochromes are combined;

an evaluation result computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine both a first evaluation result of the gradation correction curve, which is determined from the density measurement data, and a second evaluation result of the gradation correction curve, which is determined from the colorimetry data; and an evaluation result display section for displaying both the first evaluation result and the second evaluation result determined in said evaluation result computing section.

Further, there is provided, of a gradation correction curve evaluation result display apparatus, a second gradation correction curve evaluation result display apparatus for displaying an evaluation result of a gradation correction curve for correcting a gradation of an image, said gradation correction curve evaluation result display apparatus comprising:

a patch data producing section for producing monochromatic patch data representative of a plurality of monochromatic density patches for each of monochromes, and gray patch data representative of a plurality of gray density patches for a gray in which the monochromes are combined;

an evaluation result computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a third evaluation result formed by combination of both a first evaluation result of the gradation correction curve, which is determined from the density measurement data, and a second evaluation result of the gradation correction curve, which is determined from the colorimetry data; and an evaluation result display section for displaying the third evaluation result determined in said evaluation result computing section.

The first gradation correction curve evaluation result display apparatus and the second gradation correction curve evaluation result display apparatus correspond to the first gradation correction curve evaluation result display method and the second gradation correction curve evaluation result display method, respectively. Those first gradation correction curve evaluation result display apparatus and second gradation correction curve evaluation result display apparatus include all the aspects of the first gradation correction curve evaluation result display method and the second gradation correction curve evaluation result display method, for example, a point that a standard value is stored to establish a deviation from the standard value in form of an evaluation result, and a point that the maximum values of the deviations combined in the second gradation correction curve evaluation result display apparatus.

There is provided, of a gradation correction curve evaluation result display program storage medium, a first gradation correction curve evaluation result display program storage medium storing a gradation correction curve evaluation result display program which causes a computer to operate as a gradation correction curve evaluation result display apparatus for displaying an evaluation result of a gradation correction curve for correcting a gradation of an image, when the gradation correction curve evaluation result display program is executed in the computer system, wherein said gradation correction curve evaluation result display program storage medium stores the gradation correction curve evaluation result display program comprising:

a patch data producing section for producing monochromatic patch data representative of a plurality of monochromatic density patches for each of monochromes, and gray patch data representative of a plurality of gray density patches for a gray in which the monochromes are combined;

an evaluation result computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine both a first evaluation result of the gradation correction curve, which is determined from the density measurement data, and a second evaluation result of the gradation correction curve, which is determined from the colorimetry data; and an evaluation result display section for displaying both the first evaluation result and the second evaluation result determined in said evaluation result computing section.

Further, there is provided, of a gradation correction curve evaluation result display program storage medium, a second gradation correction curve evaluation result display program storage medium storing a gradation correction curve evaluation result display program which causes a computer to operate as a gradation correction curve evaluation result display apparatus for displaying an evaluation result of a gradation correction curve for correcting a gradation of an image, when the gradation correction curve evaluation result display program is executed in the computer system, wherein said gradation correction curve evaluation result display program storage medium stores the gradation correction curve evaluation result display program comprising:

a patch data producing section for producing monochromatic patch data representative of a plurality of monochromatic density patches for each of monochromes, and gray patch data representative of a plurality of gray density patches for a gray in which the monochromes are combined;

an evaluation result computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a third evaluation result formed by combination of both a first evaluation result of the gradation correction curve, which is determined from the density measurement data, and a second evaluation result of the gradation correction curve, which is determined from the colorimetry data; and an evaluation result display section for displaying the third evaluation result determined in said evaluation result computing section.

Those first gradation correction curve evaluation result display program storage medium and second gradation correction curve evaluation result display storage medium include all the aspects of the first gradation correction curve evaluation result display method and the second gradation correction curve evaluation result display method, respectively.

As mentioned above, according to the present invention, it is possible to readily produce a gradation correction curve.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A gradation correction curve producing method of producing a gradation correction curve for correcting a gradation of an image, said gradation correction curve producing method comprising:

a patch output step of outputting a plurality of monochromatic density patches for each of monochromes, and a plurality of gray density patches for a gray in which the monochromes are combined;

a measurement and colorimetry step of measuring density of the plurality of monochromatic density patches, and performing a colorimetry of the plurality of gray density patches; and a gradation correction curve computing step of determining a gradation correction curve for each monochrome for gradation correction using a first gradation correction curve for each monochrome obtained through measuring density of the plurality of monochromatic density patches, and a second gradation correction curve for each monochrome determined from colorimetry values obtained through the colorimetry of the plurality of gray density patches.

2. A gradation correction curve producing method according to claim 1, wherein said gradation correction curve computing step comprises:

a deviation correction curve computing step in which a predetermined gradation correction standard curve for each monochrome is prepared beforehand, a first gradation deviation correction curve for correcting a deviation between the first gradation correction curve and the gradation correction standard curve is determined for each monochrome, and a second gradation deviation correction curve for correcting a deviation between the second gradation correction curve and the gradation correction standard curve is determined for each monochrome;

a deviation correction curve internal division step of internally dividing the first gradation deviation correction curve and the second gradation deviation correction curve determined in said deviation correction curve computing step with a predetermined adjustable weight to determine a third gradation deviation correction curve for each monochrome; and a standard curve adjusting step of adjusting the gradation correction standard curve in accordance with the third gradation deviation correction curve determined in said deviation correction curve internal division step to determine the gradation correction curve for each monochrome for gradation correction.

3. A gradation correction curve producing method according to claim 2, wherein said deviation correction curve internal division step internally divides the first gradation deviation correction curve and the second gradation deviation correction curve determined in said deviation correction curve computing step with same weight for any monochrome to determine the third gradation deviation correction curve for each monochrome.

4. A gradation correction curve producing apparatus for producing a gradation correction curve for correcting a gradation of an image, said gradation correction curve producing apparatus comprising:

a patch data producing section for producing monochromatic patch data representative of a plurality of monochromatic density patches for each of monochromes, and gray patch data representative of a plurality of gray density patches for a gray in which the monochromes are combined; and a gradation correction curve computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a gradation correction curve for each monochrome for gradation correction using a first gradation correction curve for each monochrome obtained by the density measurement data, and a second gradation correction curve for each monochrome determined from the colorimetry data.

5. A gradation correction curve producing apparatus according to claim 4, wherein said gradation correction curve computing section comprises:

a deviation correction curve computing section having a memory for storing a predetermined gradation correction standard curve for each monochrome, for determining a first gradation deviation correction curve for correcting a deviation between the first gradation correction curve and the gradation correction standard curve for each monochrome, and a second gradation deviation correction curve for correcting a deviation between the second gradation correction curve and the gradation correction standard curve for each monochrome;

a deviation correction curve internal division arithmetic operation section for internally dividing the first gradation deviation correction curve and the second gradation deviation correction curve determined in said deviation correction curve computing section with weight set up in accordance with an operation to determine a third gradation deviation correction curve for each monochrome; and a standard curve adjusting section for adjusting the gradation correction standard curve in accordance with the third gradation deviation correction curve determined in said deviation correction curve internal division arithmetic operation section to determine the gradation correction curve for each monochrome for gradation correction.

6. A gradation correction curve producing apparatus according to claim 5, further comprising a weight set up section for setting up, as weight of an internal division of the first gradation deviation correction curve and the second gradation deviation correction curve determined in said deviation correction curve computing section, a common weight applicable to an internal division arithmetic operation for any monochrome in accordance with an operation.

7. A gradation correction curve evaluation result display program storage medium storing a gradation correction curve evaluation result display program which causes a computer to operate as a gradation correction curve evaluation result display apparatus for displaying an evaluation result of a gradation correction curve for correcting a gradation of an image, when the gradation correction curve evaluation result display program is executed in the computer system, wherein said gradation correction curve evaluation result display program storage medium stores the gradation correction curve evaluation result display program comprising:

a patch data producing section for producing monochromatic patch data representative of a plurality of monochromatic density patches for each of monochromes, and gray patch data representative of a plurality of gray density patches for a gray in which the monochromes are combined; and a gradation correction curve computing section for obtaining density measurement data of the plurality of monochromatic density patches outputted in accordance with the monochromatic patch data produced in said patch data producing section and obtaining colorimetry data of the plurality of gray density patches outputted in accordance with the gray patch data produced in said patch data producing section to determine a gradation correction curve for each monochrome for gradation correction using a first gradation correction curve for each monochrome obtained by the density measurement data, and a second gradation correction curve for each monochrome determined from the colorimetry data.

8. A gradation correction curve evaluation result display program storage medium according to claim 7, wherein said gradation correction curve computing section comprises:

a deviation correction curve computing section storing a predetermined gradation correction standard curve for each monochrome, for determining a first gradation deviation correction curve for correcting a deviation between the first gradation correction curve and the gradation correction standard curve for each monochrome, and a second gradation deviation correction curve for correcting a deviation between the second gradation correction curve and the gradation correction standard curve for each monochrome;

a deviation correction curve internal division arithmetic operation section for internally dividing the first gradation deviation correction curve and the second gradation deviation correction curve determined in said deviation correction curve computing section with weight set up in accordance with an operation to determine a third gradation deviation correction curve for each monochrome; and a standard curve adjusting section for adjusting the gradation correction standard curve in accordance with the third gradation deviation correction curve determined in said deviation correction curve internal division arithmetic operation section to determine the gradation correction curve for each monochrome for gradation correction.

9. A gradation correction curve evaluation result display program storage medium according to claim 8, wherein said gradation correction curve evaluation result display program further comprises a weight set up section for setting up, as weight of an internal division of the first gradation deviation correction curve and the second gradation deviation correction curve determined in said deviation correction curve computing section, a common weight applicable to an internal division arithmetic operation for any monochrome in accordance with an operation.

* * * * *